United States Patent
Folkesson

(10) Patent No.: US 12,305,735 B2
(45) Date of Patent: May 20, 2025

(54) TRANSMISSION, GEARBOX AND VEHICLE

(71) Applicant: VOLVO TRUCK CORPORATION, Gothenburg (SE)

(72) Inventor: Johan Folkesson, Skene (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 18/509,635

(22) Filed: Nov. 15, 2023

(65) Prior Publication Data

US 2024/0183429 A1  Jun. 6, 2024

(30) Foreign Application Priority Data

Dec. 5, 2022  (EP) .................................... 22211422

(51) Int. Cl.
  *F16H 1/20*  (2006.01)
  *B23F 5/16*  (2006.01)
  *F16H 3/00*  (2006.01)

(52) U.S. Cl.
  CPC ............. *F16H 1/203* (2013.01); *B23F 5/163* (2013.01); *F16H 3/006* (2013.01)

(58) Field of Classification Search
  CPC ........... F16H 1/203; F16H 3/006; B23F 5/163
  USPC .......................................................... 74/325
  See application file for complete search history.

(56) References Cited

U.S. PATENT DOCUMENTS

| | | | |
|---|---|---|---|
| 3,305,061 A | 2/1967 | Duncan | |
| 4,270,639 A | 6/1981 | Johnsson | |
| 4,782,929 A * | 11/1988 | Muller | F16D 23/025 192/53.35 |
| 5,036,719 A * | 8/1991 | Razzacki | F16D 23/025 192/53.36 |
| 5,311,787 A * | 5/1994 | Wilson | F16D 23/12 74/15.88 |
| 2011/0167957 A1 * | 7/2011 | Kato | F16H 61/0059 74/665 E |

(Continued)

FOREIGN PATENT DOCUMENTS

| | | |
|---|---|---|
| DE | 19820654 A1 | 11/1999 |
| DE | 10149845 A1 | 4/2003 |

OTHER PUBLICATIONS

Extended European Search Report in corresponding European Application No. 22211422.5 dated Apr. 11, 2023 (9 pages).

*Primary Examiner* — Ha Dinh Ho
(74) *Attorney, Agent, or Firm* — Venable LLP; Jeffri A. Kaminski

(57) ABSTRACT

A transmission includes a primary gear including primary teeth, each having a primary surface; a secondary gear including secondary teeth; an intermediate gear including intermediate teeth, each comprising a primary intermediate part having a primary intermediate surface and a secondary intermediate part having a secondary intermediate surface, where the primary intermediate part is axially offset from the secondary intermediate part. The intermediate gear is axially displaceable to an engaged position. The primary surface contacts the primary intermediate surface in a contact region and the secondary intermediate surface contacts one of the secondary teeth. In the engaged position, one primary tooth and one intermediate tooth form an overlap, radially inside the contact region, for preventing the intermediate gear from being displaced from the engaged position to a disengaged position.

11 Claims, 16 Drawing Sheets

(56) References Cited

U.S. PATENT DOCUMENTS

2012/0060632 A1* 3/2012 Appelshaeuser ..... F16D 23/025
 74/339
2013/0239718 A1* 9/2013 Asada ..................... F16D 23/06
 74/339

* cited by examiner

TRANSMISSION, GEARBOX AND VEHICLE

TECHNICAL FIELD

The disclosure relates generally to transmissions. In particular aspects, the disclosure relates to a transmission, a gearbox and a vehicle. The disclosure can be applied in heavy-duty vehicles, such as trucks, buses, and construction equipment. Although the disclosure may be described with respect to a particular vehicle, the disclosure is not restricted to any particular vehicle.

BACKGROUND

A transmission for a vehicle may comprise an input gear, a first output gear, a second output gear and a sleeve. Each of the input gear, the first output gear, the second output gear and the sleeve may be rotatable about a common rotation axis. The sleeve may be axially movable along the rotation axis to position the transmission in neutral, or to selectively couple the input gear to either the first output gear or the second output gear. When the sleeve is in a disengaged position, the transmission is in a neutral state and rotation of the input gear is not transmitted by the sleeve to any of the first output gear and the second output gear. When the sleeve is axially moved from the disengaged position to a first engaged position, the sleeve couples the input gear to the first output gear such that rotation of the input gear is transmitted by the sleeve to a rotation of the first output gear. When the sleeve is axially moved from the disengaged position to a second engaged position, the sleeve couples the input gear to the second output gear such that rotation of the input gear is transmitted by the sleeve to a rotation of the second output gear. By virtue of the sleeve, different force paths, and consequentially also different gear ratios, can be accomplished. In order for the sleeve to stay in the first position or in the second position when torque is transferred from the input gear to the first output gear or the second output gear, respectively, the transmission may comprise a disengagement preventing solution.

SUMMARY

According to a first aspect of the disclosure, there is provided a transmission comprising a primary gear rotatable about a rotation axis and including primary teeth, where each primary tooth has a primary surface; a secondary gear rotatable about the rotation axis and including secondary teeth; an intermediate gear rotatable about the rotation axis and including intermediate teeth, where each intermediate tooth comprises a primary intermediate part having a primary intermediate surface and a secondary intermediate part having a secondary intermediate surface, where the primary intermediate part is axially offset from the secondary intermediate part with respect to the rotation axis, and where the intermediate gear is axially displaceable along the rotation axis between an engaged position where the primary surface contacts the primary intermediate surface in a contact region and the secondary intermediate surface contacts one of the secondary teeth, and a disengaged position; wherein in the engaged position, one primary tooth and one intermediate tooth form an overlap, radially inside the contact region with respect to the rotation axis and as seen along the rotation axis, for preventing the intermediate gear from being displaced from the engaged position to the disengaged position.

The first aspect of the disclosure may seek to prevent unintended disengagement or gear jump-out of the intermediate gear when the intermediate gear is in the engaged position with a more compact design. The overlap formed between one primary tooth and one intermediate tooth prevent gear jump-out of the intermediate gear in the engaged position. That is, the overlap prevents the intermediate gear from moving axially along the rotation axis from the engaged position to the disengaged position when torque is transferred between the primary gear and the secondary gear via the intermediate gear. Since the secondary intermediate part both contacts a secondary tooth and prevents disengagement of the intermediate gear in the engaged position, the secondary intermediate part serves two purposes. A technical benefit may therefore include a more compact transmission along the rotation axis, with improved prevention of unintended disengagement of the intermediate gear.

When the intermediate gear is in the engaged position, torque may be transferred from the primary gear to the secondary gear via the intermediate gear. Conversely, when the intermediate gear is in the disengaged position, torque may not be transferred from the primary gear to the secondary gear. In the disengaged position, the primary teeth may be axially aligned with the secondary intermediate parts with respect to the rotation axis. Thus, the secondary intermediate parts may be positioned between the primary teeth in the disengaged position.

When the intermediate gear adopts the engaged position, the transmission may adopt an engaged state. When the intermediate gear adopts the disengaged position, the transmission may adopt a disengaged or neutral state.

The intermediate gear may be a sleeve. The primary gear may be a hub.

The primary gear may be an input gear and the secondary gear may be an output gear, or vice versa. A radial extension of the primary teeth may be larger than a radial extension of the secondary teeth. The primary teeth and the secondary teeth may extend radially outwards, and the intermediate teeth may extend radially inwards, with respect to the rotation axis. Each primary intermediate surface may be positioned radially outside an associated secondary intermediate surface with respect to the rotation axis. The overlap may be formed by one secondary intermediate part and one primary tooth.

Unless indicated otherwise, an axial direction according to the disclosure refers to a direction parallel with the rotation axis and a radial direction according to the disclosure refers to a radial direction with respect to the rotation axis.

In some examples, each intermediate tooth has a constant cross-sectional profile along the primary intermediate surface across a width of the intermediate gear. A technical benefit may include a less complicated and cheaper manufacture. The intermediate tooth may for example be machined straight along the primary intermediate surface across the width of the intermediate gear with a single machining step or may enable use of non-cutting manufacturing methods, such as forging and sintering for shaping the intermediate tooth. Correspondingly, each intermediate tooth may have a constant cross-sectional profile along the secondary intermediate surface across a width of the secondary intermediate part.

In some examples, the secondary teeth are positioned radially inside the primary intermediate part with respect to the rotation axis.

In some examples, the secondary teeth are entirely positioned radially inside the primary intermediate part with respect to the rotation axis.

In some examples, the overlap and the secondary teeth are substantially aligned in a radial direction with respect to the rotation axis.

In some examples, the primary intermediate surface and the secondary intermediate surface are machined with a machining tool moving axially through the intermediate gear with respect to the rotation axis. Such intermediate tooth can be distinguished from an intermediate tooth that is not machined in this manner or that includes additional shaping of the intermediate tooth. A machining of the primary intermediate surface and the secondary intermediate surface using a machining tool moving axially through the intermediate gear, i.e., across a width thereof, provides a very efficient manufacture.

In some examples, the primary intermediate parts are first primary intermediate parts, the primary intermediate surfaces are first primary intermediate surfaces, and each intermediate tooth further comprises a second primary intermediate part having a second primary intermediate surface arranged on an opposite side of the secondary intermediate surface with respect to the first primary intermediate surface, and the second primary intermediate surfaces and the first primary intermediate surface have corresponding designs. The first primary intermediate parts and the second primary intermediate parts may be of mirrored designs with respect to a plane transverse to the rotation axis and axially aligned centered on the secondary intermediate part.

In some examples, the engaged position is a first engaged position, the secondary gear is a first secondary gear, the secondary teeth are first secondary teeth. In this case, the transmission may further comprise a second secondary gear rotatable about the rotation axis and including second secondary teeth; wherein the intermediate gear is axially displaceable from the first engaged position, through the disengaged position and to a second engaged position where the primary surface contacts the second primary intermediate surface and the secondary intermediate surface contacts one of the second secondary teeth. In this way, the secondary intermediate part can drive the second secondary gear in the second engaged position in the same manner as the secondary intermediate part drives the first secondary gear in the first engaged position.

A radial extension of the primary teeth may be larger than a radial extension of the second secondary teeth. The first secondary teeth and the second secondary teeth may have the same, or substantially the same, radial extension. When the intermediate gear adopts the first engaged position, the transmission may adopt a first engaged state. When the intermediate gear adopts the second engaged position, the transmission may adopt a second engaged state.

In some examples, the first secondary teeth and the second secondary teeth are positioned radially inside the first primary intermediate parts and the second primary intermediate parts with respect to the rotation axis. In this way, the first secondary teeth may be axially aligned with, and radially inside, the second primary intermediate parts, and the second secondary teeth may be axially aligned with, and radially inside, the first primary intermediate parts, when the intermediate gear is in the disengaged position. This may contribute to an axially compact design of the transmission.

In addition to the first secondary teeth, the first secondary gear may comprise a first secondary section. The first secondary teeth may be positioned axially between the first secondary section and the primary gear. A radial extension of the first secondary section may be larger than a radial extension of the first secondary teeth. Correspondingly, in addition to the second secondary teeth, the second secondary gear may comprise a second secondary section. The second secondary teeth may be positioned axially between the second secondary section and the primary gear. A radial extension of the second secondary section may be larger than a radial extension of the second secondary teeth. Each of the first secondary section and the second secondary section may be a flange.

Each of the first primary intermediate parts and the second primary intermediate parts may perform two functions. Each first primary intermediate part may be driven by the primary gear in the first engaged position and may limit axial displacement by contacting the second secondary section in the second engaged position. Correspondingly, each second primary intermediate part may limit axial displacement by contacting the first secondary section in the first primary engaged position and may be driven by the primary gear in the second engaged position. The dual functions performed by the first primary intermediate parts and the second primary intermediate parts may contribute to a more compact design of the transmission.

The primary gear may be an input gear, the first secondary gear may be a first output gear and the second secondary gear may be a second output gear. Alternatively, first secondary gear may be a first input gear, the second secondary gear may be a second input gear and the primary gear may be an output gear. In any case, the first secondary gear and the second secondary gear may be arranged in parallel with respect to the primary gear.

According to a second aspect of the disclosure, there is provided a gearbox comprising the transmission according to the first aspect. The gearbox may comprise an actuator configured to move the intermediate gear between the engaged position and the disengaged position. The actuator may comprise a fork engaging the intermediate gear. The actuator may be moved by manual force and/or may be powered to move based on gearshift commands, either manual or automatic gearshift commands.

According to a third aspect of the disclosure, there is provided a vehicle comprising the transmission according to the first aspect or a gearbox according to the second aspect.

The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein. There are also disclosed herein control units, computer readable media, and computer program products associated with the above discussed technical benefits.

BRIEF DESCRIPTION OF THE DRAWINGS

With reference to the appended drawings, below follows a more detailed description of aspects of the disclosure cited as examples.

DETAILED DESCRIPTION

Aspects set forth below represent the necessary information to enable those skilled in the art to practice the disclosure.

Figure 22:
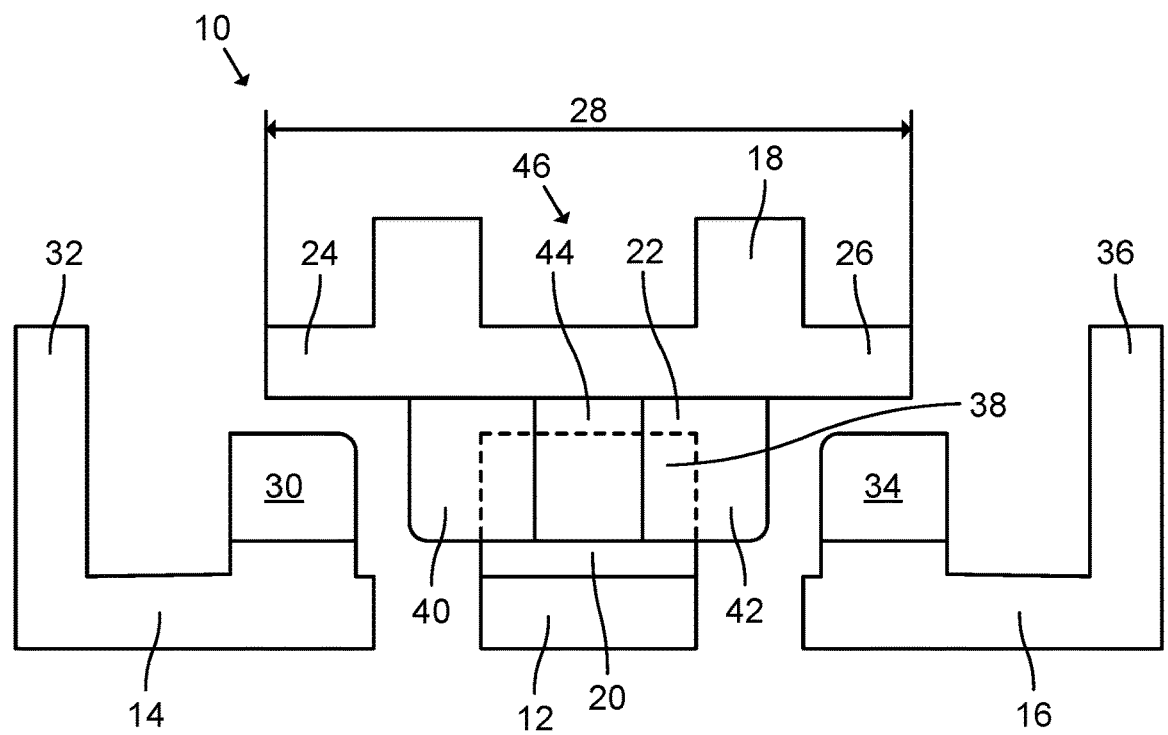
FIG. 22 shows a schematic partial cross-sectional front view of a prior art transmission when a prior art intermediate gear is in a disengaged position.
Figure 23:
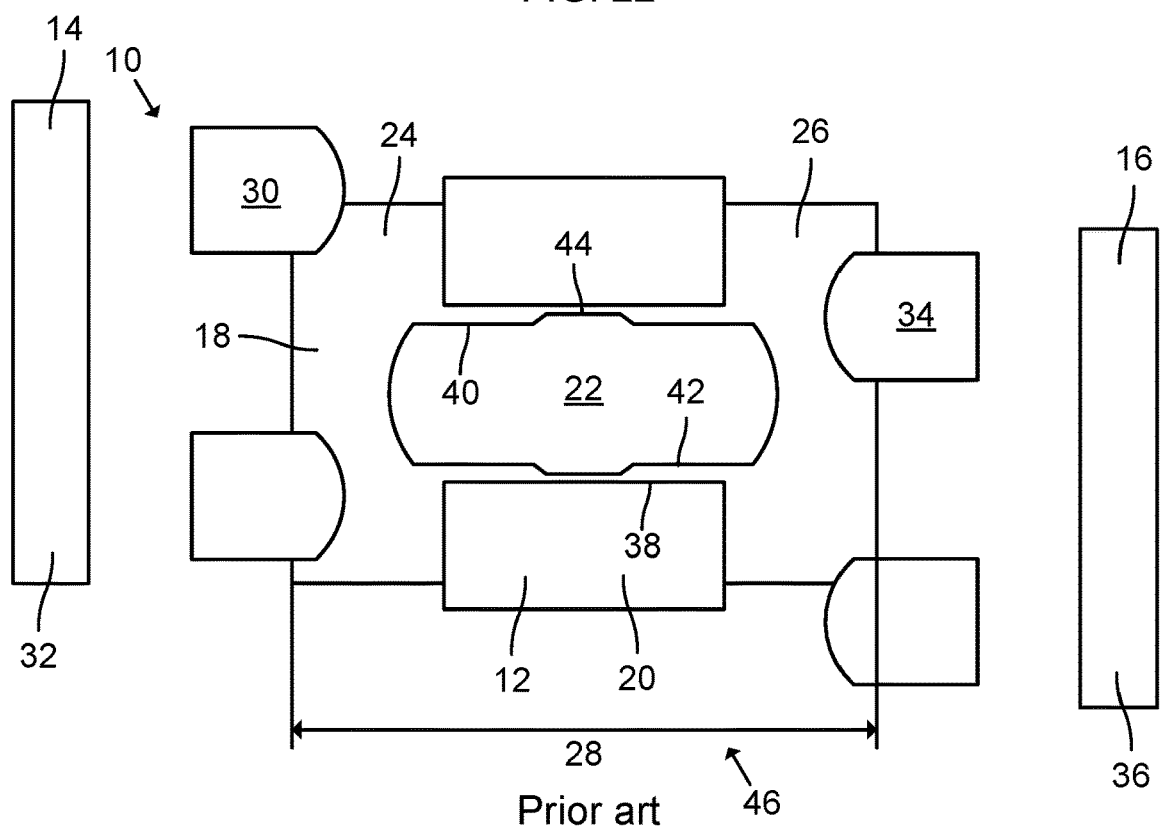
FIG. 23 shows a schematic partial cross-sectional radial view of the prior art transmission when the prior art intermediate gear is in the disengaged position.

FIG. 22 shows a schematic partial cross-sectional front view of a prior art transmission 10 and FIG. 23 shows a schematic partial cross-sectional radial view of the prior art transmission 10. With collective reference to FIGS. 22 and 23, the prior art transmission 10 comprises primary gear 12, a first secondary gear 14, a second secondary gear 16 and an intermediate gear 18. Each of the primary gear 12, the first secondary gear 14, the second secondary gear 16 and the intermediate gear 18 are rotatable about a common rotation axis (not shown).

The primary gear 12 comprises a plurality of primary teeth 20. The intermediate gear 18 comprises a plurality of intermediate teeth 22. The intermediate gear 18 further comprises a first intermediate flange 24 and a second intermediate flange 26. The intermediate teeth 22 are positioned axially between the first intermediate flange 24 and the second intermediate flange 26 with respect to the rotation axis. The intermediate gear 18 has a width 28.

The first secondary gear 14 comprises a plurality of first secondary teeth 30 and a first secondary flange 32. Correspondingly, the second secondary gear 16 comprises a plurality of second secondary teeth 34 and a second secondary flange 36.

Each primary tooth 20 comprises opposing primary surfaces 38. Each intermediate tooth 22 comprises opposing first intermediate surfaces 40, opposing second intermediate surfaces 42 and a bulge 44 between each pair of a first intermediate surface 40 and a second intermediate surface 42. The first intermediate surface 40 and the second intermediate surface 42 of each pair are parallel. Each bulge 44 protrudes in a circumferential direction of the intermediate gear 18 with respect to the associated first intermediate surface 40 and the associated second intermediate surface 42.

In FIGS. 22 and 23, the intermediate gear 18 is in a disengaged position 46. In the disengaged position 46, the primary teeth 20 mesh with the intermediate teeth 22 such that primary surfaces 38 contact bulges 44. A rotation of the primary gear 12 is thus transmitted to a rotation of the intermediate gear 18. The intermediate gear 18 does however not drive any of the first secondary gear 14 and the second secondary gear 16 in the disengaged position 46. The disengaged position 46 of the intermediate gear 18 thus corresponds to a disengaged state of the prior art transmission 10.

Figure 24:
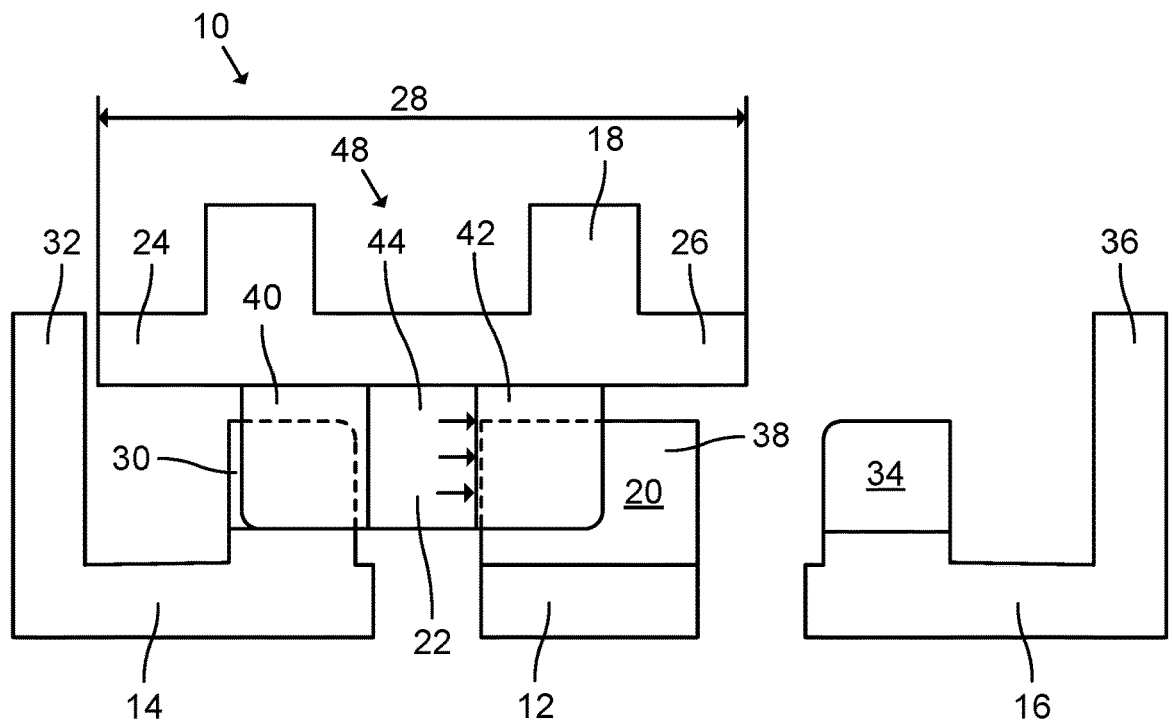
FIG. 24 shows a schematic partial cross-sectional front view of the prior art transmission when the prior art intermediate gear is in an engaged position.
Figure 25:
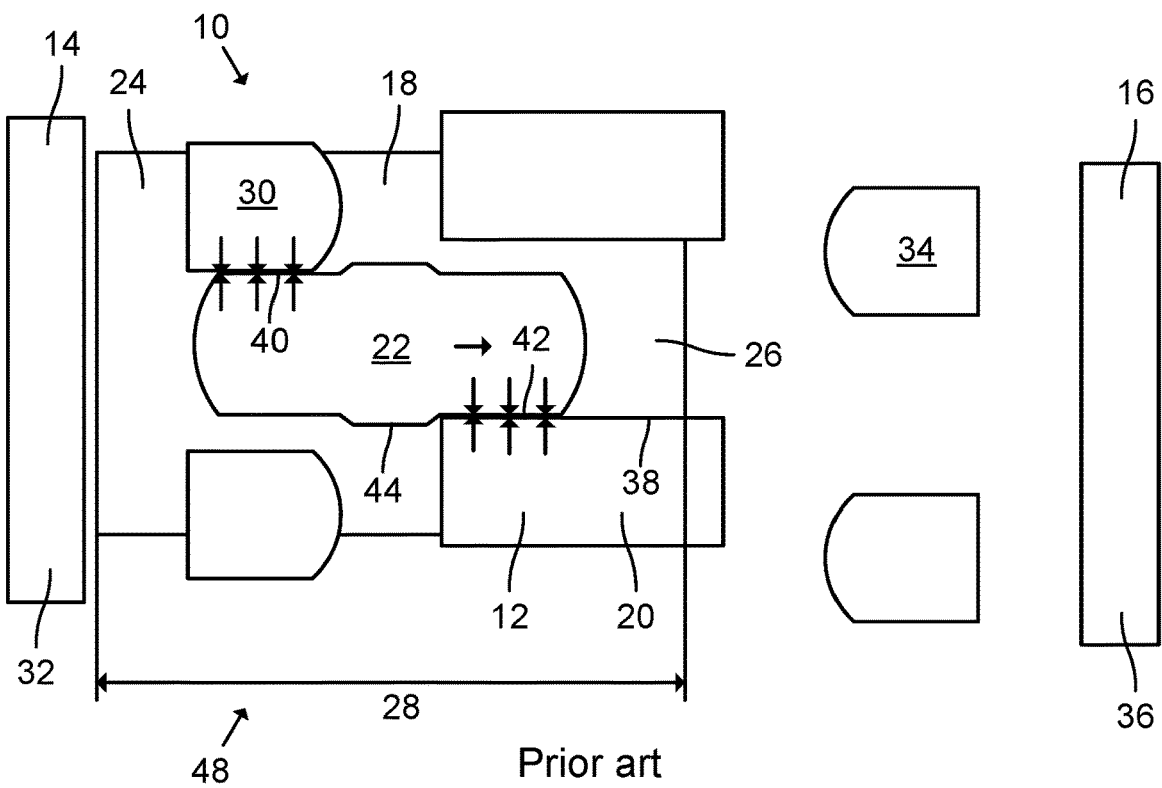
FIG. 25 shows a schematic partial cross-sectional radial view of the prior art transmission when the prior art intermediate gear is in the engaged position.

FIG. 24 shows a schematic partial cross-sectional front view of the prior art transmission 10 and FIG. 25 shows a schematic partial cross-sectional radial view of the prior art transmission 10. With collective reference to FIGS. 24 and 25, the intermediate gear 18 has been moved from the disengaged position 46 to a first engaged position 48. In the first engaged position 48, the primary surfaces 38 contact and drive the second intermediate surfaces 42, and the first intermediate surfaces 40 contact and drive the first secondary teeth 30. Thus, a rotation of the primary gear 12 is transmitted to a rotation of the intermediate gear 18 and the rotation of the intermediate gear 18 is transmitted to a rotation of the first secondary gear 14. The first engaged position 48 of the intermediate gear 18 thus corresponds to a first engaged state of the prior art transmission 10.

In the first engaged position 48, as long as the primary surfaces 38 engage the second intermediate surfaces 42 to transmit torque, the bulges 44 prevent the intermediate gear 18 from moving from the first engaged position 48 back to the disengaged position 46 (to the right in FIGS. 24 and 25). In this way, gear jump-out can be prevented. The prior art transmission 10 may thus be said to be of the bulge type. Since the bulges 44 are circumferentially offset from the first intermediate surfaces 40 and the second intermediate surfaces 42, the first intermediate surfaces 40, the bulges 44 and the second intermediate surfaces 42 cannot be manufactured with a single machining step. The prior art transmission therefore has a complicated design and is expensive to manufacture.

Furthermore, in the first engaged position 48, the first intermediate flange 24 may contact the first secondary flange 32 to prevent axial movement of the intermediate gear 18 (to the left in FIGS. 24 and 25). The second intermediate flange 26 and the second secondary flange 36 may interact in a corresponding manner when the intermediate gear 18 is in a second engaged position (not illustrated). The first intermediate flange 24 and the second intermediate flange 26 take up axial space of the prior art transmission 10. Moreover, axial space needs to be provided for the bulges 44 between the primary surfaces 38 and the first secondary teeth 30. The bulges 44 are not used for torque transfer in the first engaged position 48. The prior art transmission 10 therefore has a bulky design, i.e., the width 28 is large.

Figure 1:
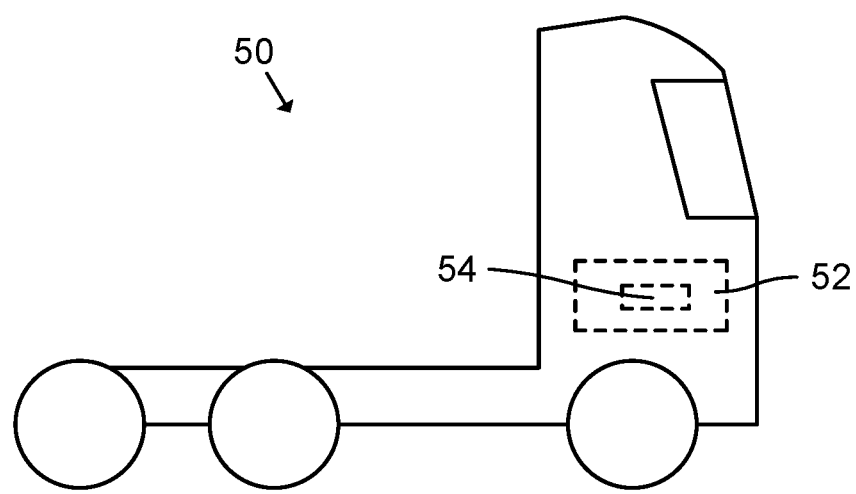
FIG. 1 shows an exemplary vehicle comprising a gearbox including a transmission according to one example.

FIG. 1 shows an exemplary vehicle 50, here exemplified as a truck. The vehicle 50 comprises a gearbox 52. The gearbox 52 in turn comprises a transmission 54 according to one example.

Figure 2:
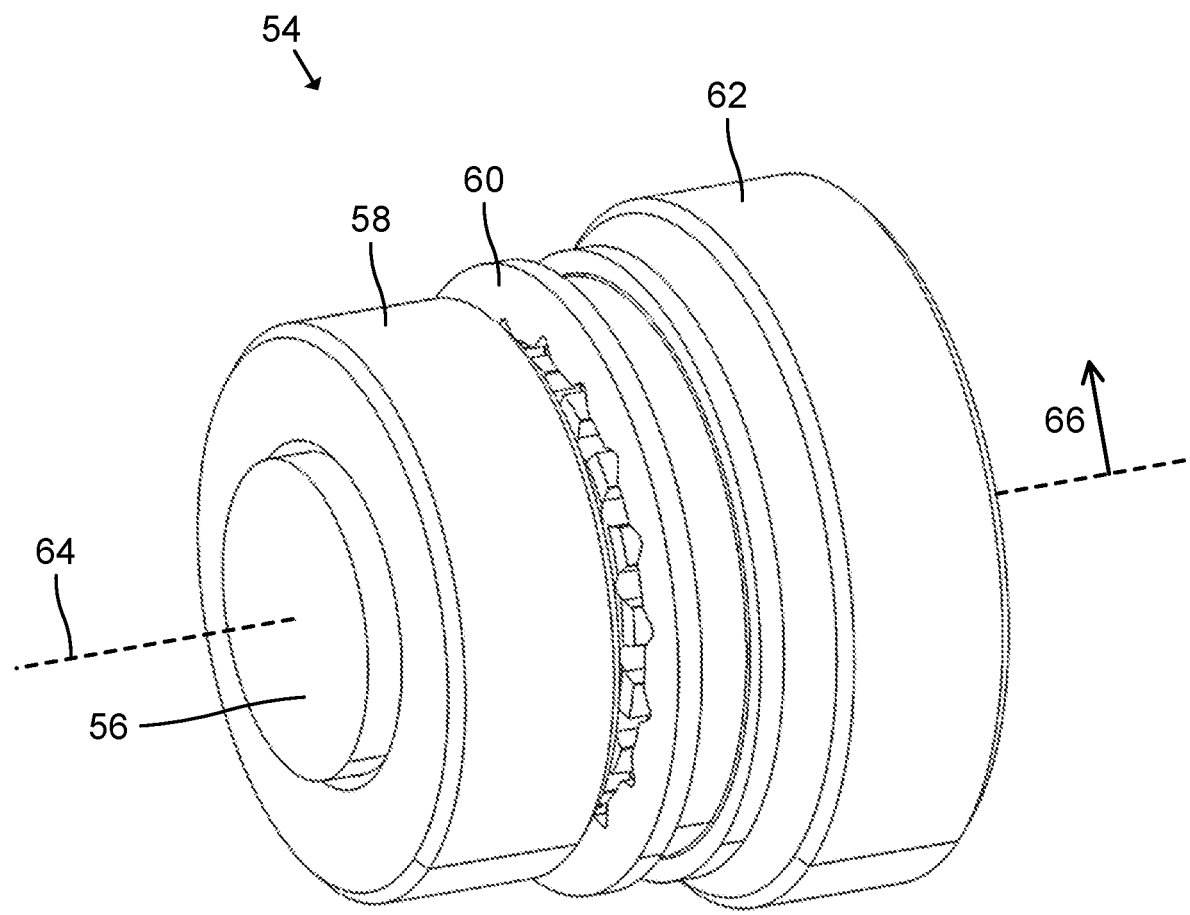
FIG. 2 shows a perspective view of the transmission.

FIG. 2 shows a perspective view of the transmission 54. The transmission 54 of this example comprises a primary gear 56, a first secondary gear 58 and an intermediate gear 60. The transmission 54 of this example further comprises an optional second secondary gear 62. Each of the first secondary gear 58 and the second secondary gear 62 may be a secondary gear according to the disclosure. As shown in FIG. 2, each of the primary gear 56, the intermediate gear 60, the first secondary gear 58 and the second secondary gear 62 are concentric with, and rotatable about, a rotation axis 64. FIG. 2 further shows a radial direction 66 with respect to the rotation axis 64.

Figure 3:
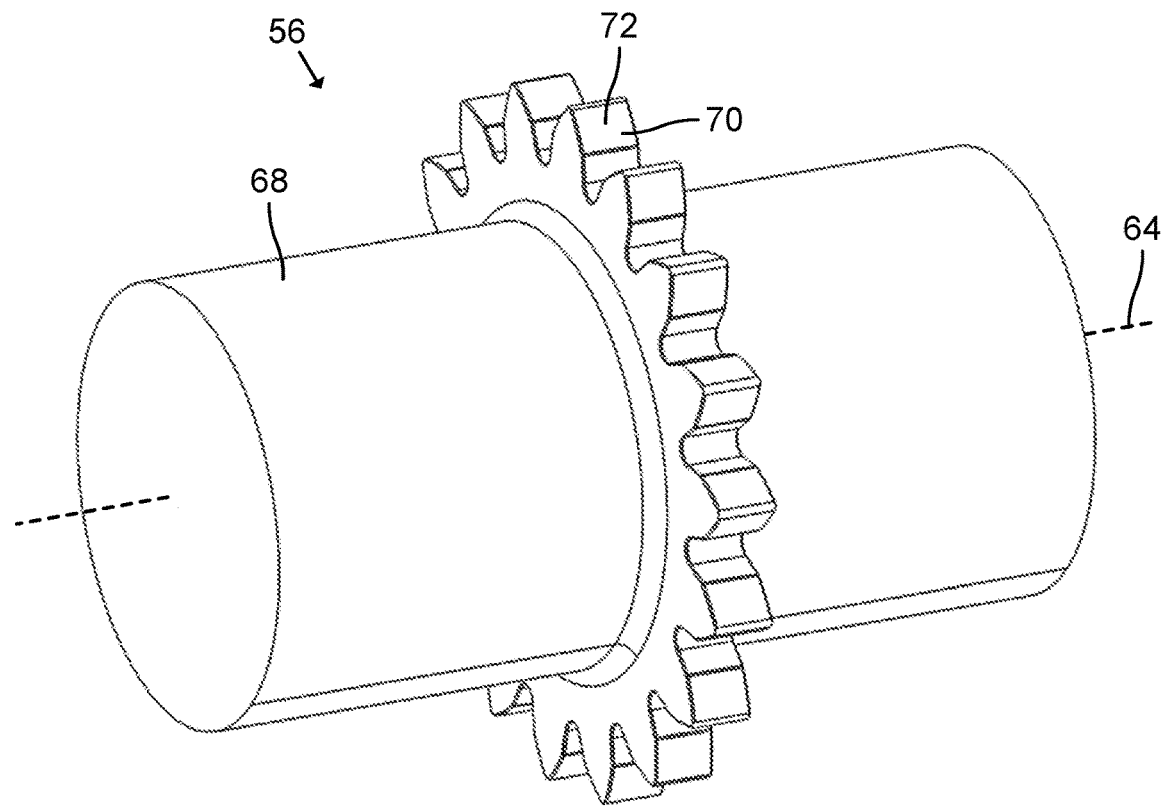
FIG. 3 shows a perspective view of a primary gear of the transmission.
Figure 4:
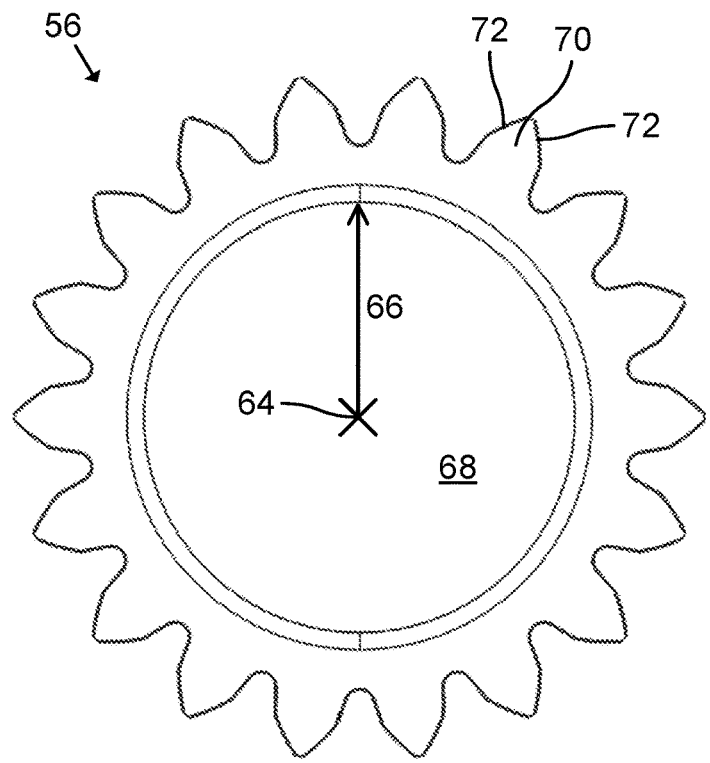
FIG. 4 shows a side view of the primary gear.

FIG. 3 shows a perspective view of the primary gear 56 and FIG. 4 shows a side view of the primary gear 56. With collective reference to FIGS. 3 and 4, the primary gear 56 of this specific and non-limiting example comprises a primary body 68 and a plurality of primary teeth 70 extending radially outwards with respect to the primary body 68. The primary gear 56 is here exemplified as a hub. Each primary tooth 70 comprises two opposing primary surfaces 72, such as a leading primary surface and a trailing primary surface. For one primary tooth 70, the primary surfaces 72 are of mirrored design with respect to a plane comprising the rotation axis 64 and the radial direction 66.

Figure 5:
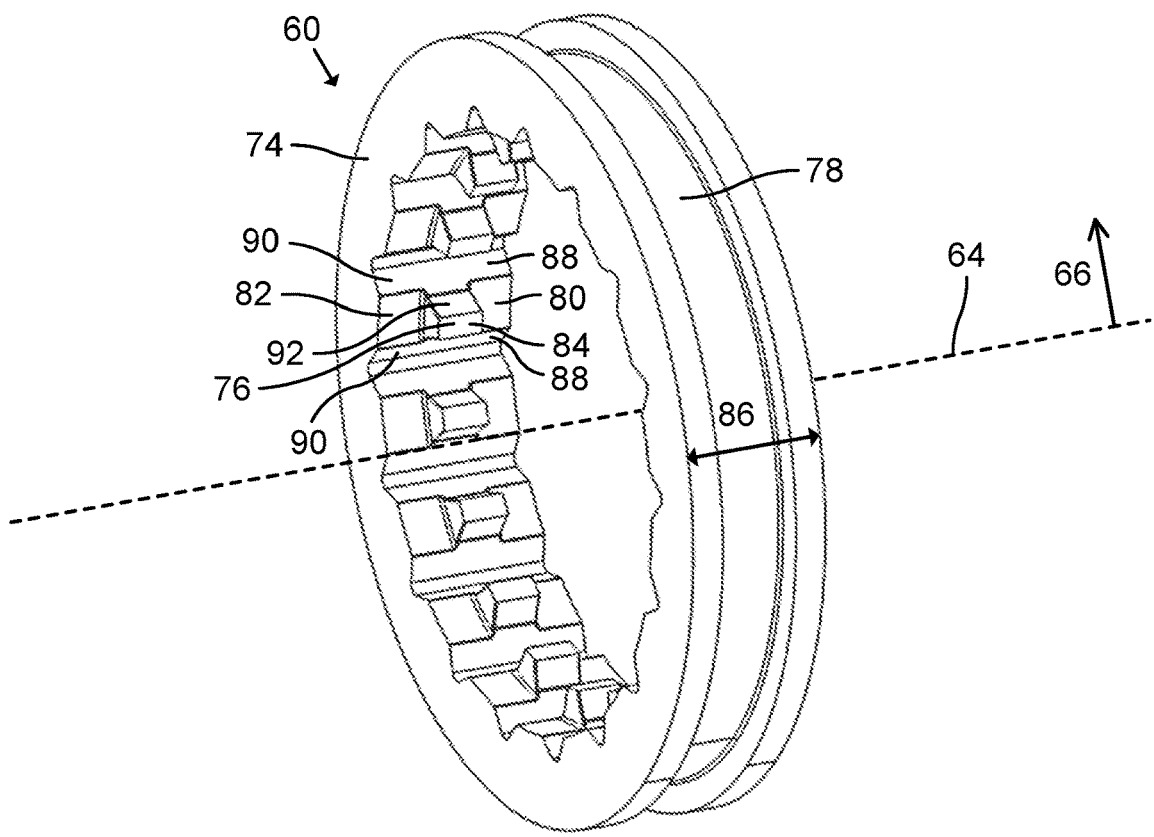
FIG. 5 shows a perspective view of an intermediate gear of the transmission.
Figure 6:
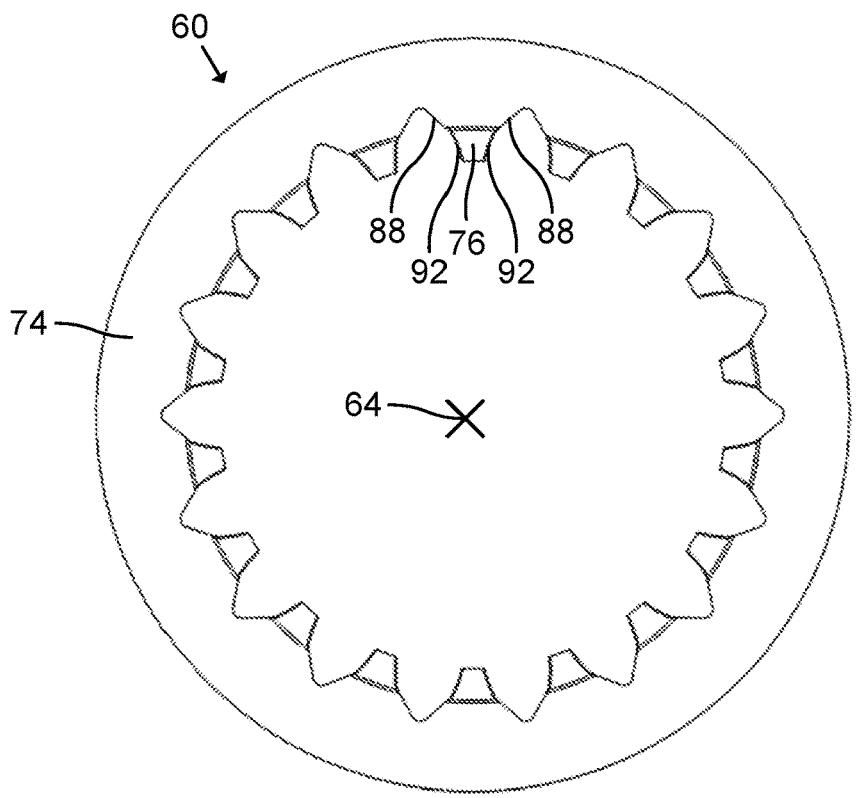
FIG. 6 shows a side view of the intermediate gear.

FIG. 5 shows a perspective view of the intermediate gear 60 and FIG. 6 shows a side view of the intermediate gear 60. With collective reference to FIGS. 5 and 6, the intermediate gear 60 of this specific and non-limiting example comprises an intermediate body 74 and a plurality of intermediate teeth 76 extending radially inwards with respect to the intermediate body 74. The intermediate body 74 of this example comprises an annular groove 78 for being engaged by a fork to move the intermediate gear 60 along the rotation axis 64.

In this example, each intermediate tooth 76 comprises a first primary intermediate part 80, a second primary intermediate part 82 and a secondary intermediate part 84. For each intermediate tooth 76, the secondary intermediate part 84 is positioned axially between the first primary intermediate part 80 and the second primary intermediate part 82 with respect to the rotation axis 64. Each of the first primary intermediate part 80 and the second primary intermediate part 82 is thus axially offset from the secondary intermediate part 84 with respect to the rotation axis 64. The intermediate gear 60 has a width 86. The intermediate gear 60 is here exemplified as a sleeve.

Each first primary intermediate part 80 comprises two opposing first primary intermediate surfaces 88, such as a leading first primary intermediate surface and a trailing first primary intermediate surface. Correspondingly, each second primary intermediate part 82 comprises two second primary intermediate surfaces 90, such as a leading second primary intermediate surface and a trailing second primary intermediate surface. The first primary intermediate part 80 and the second primary intermediate part 82 are of mirrored design with respect to a plane transverse to the rotation axis 64 and axially aligned with the secondary intermediate part 84.

Each secondary intermediate part 84 comprises two opposing secondary intermediate surfaces 92, such as a leading secondary intermediate surface and a trailing secondary intermediate surface. For each intermediate tooth 76, a pair of two opposing first primary intermediate surfaces 88, a pair of two opposing second primary intermediate surfaces 90 and a pair of two opposing secondary intermediate surfaces 92 are of mirrored design with respect to a plane comprising the rotation axis 64 and the radial direction 66. Each pair of one first primary intermediate surface 88 and one second primary intermediate surface 90 are positioned on axially opposite sides of the associated secondary intermediate surface 92.

In this example, for each intermediate tooth 76, there is a first primary intermediate surface 88 radially aligned with a second primary intermediate surface 90, and there is a secondary intermediate surface 92 positioned radially inside the first primary intermediate surface 88 and the second primary intermediate surface 90. Each first primary intermediate surface 88 and each second primary intermediate surface 90 are thus positioned radially outside the associated secondary intermediate surface 92. Each pair of a first primary intermediate surface 88 and its associated second primary intermediate surface 90 is here part of a common surface with a uniform profile parallel with the rotation axis 64. Moreover, in the specific and non-limiting example in FIG. 5, each first primary intermediate surface 88 is formed in a plane common with the associated second primary intermediate surface 90. Thus, each of the first primary intermediate surface 88 and the second primary intermediate surface 90 may optionally be flat.

As shown in FIGS. 5 and 6, each intermediate tooth 76 has a constant cross-sectional profile along the first primary intermediate surface 88 and the second primary intermediate surface 90, i.e., radially outside the secondary intermediate part 84. In contrast to the intermediate teeth 22 of the prior art transmission 10 comprising the bulge 44, each intermediate tooth 76 may therefore be machined with a single machining step across the entire width 86. Thus, in a single machining step using a machining tool moving axially through the intermediate gear 60, at least one set of a first primary intermediate surface 88 and a second primary intermediate surface 90, and optionally also a secondary intermediate surface 92, may be machined.

Figure 7:
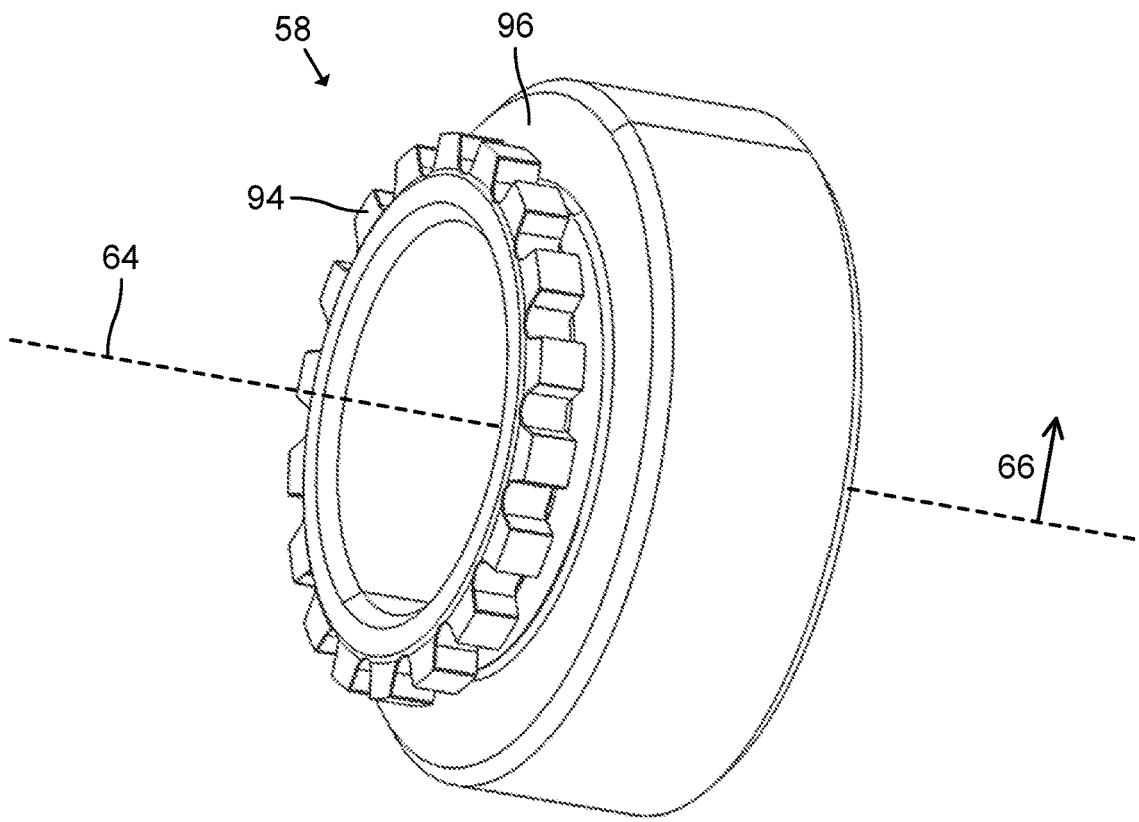
FIG. 7 shows a perspective view of a first secondary gear of the transmission.

FIG. 7 shows a perspective view of a first secondary gear 58 of the transmission 54. The first secondary gear 58 comprises a plurality of first secondary teeth 94. Each first secondary tooth 94 extends radially outwards with respect to the radial direction 66. The first secondary gear 58 of this example further comprises a first secondary section 96, here exemplified as a flange. A radial extension of the first secondary section 96 is here larger than a radial extension of the first secondary teeth 94.

Figure 8:
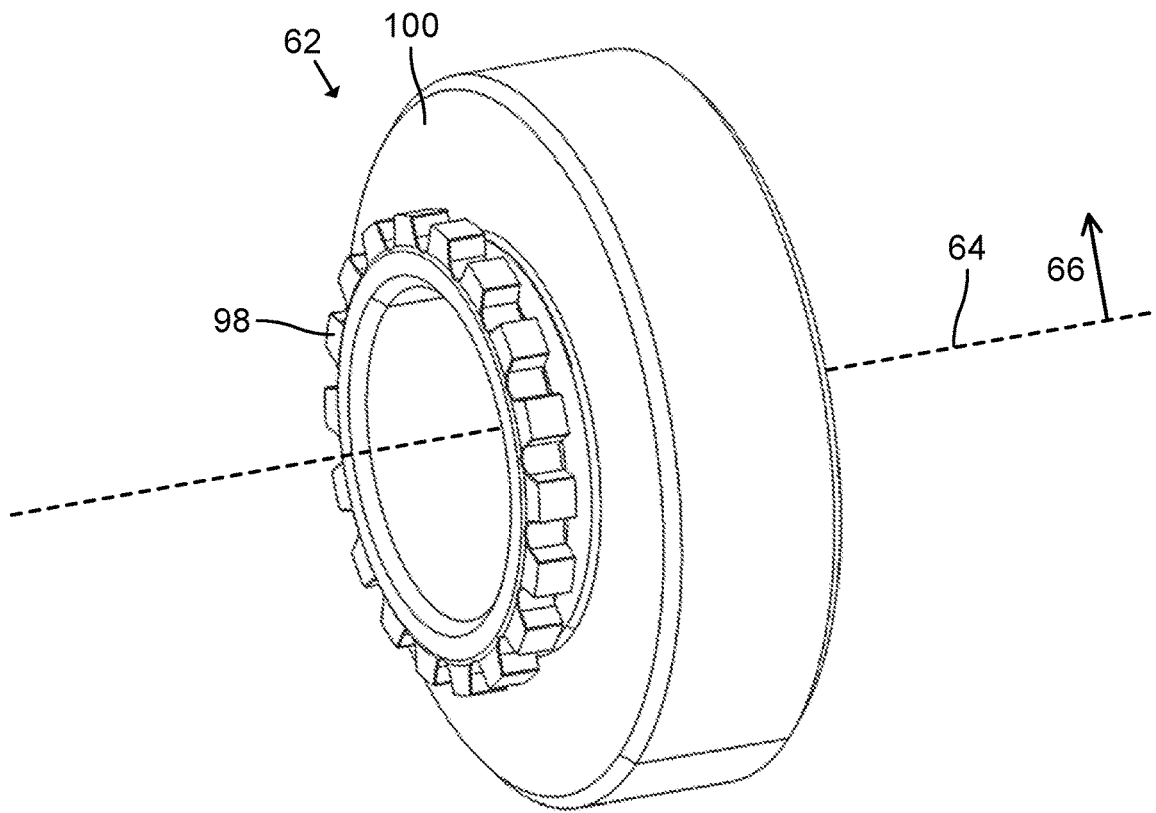
FIG. 8 shows a perspective view of a second secondary gear of the transmission.

FIG. 8 shows a perspective view of a second secondary gear 62 of the transmission 54. The second secondary gear 62 comprises a plurality of second secondary teeth 98. Each second secondary tooth 98 extends radially outwards with respect to the radial direction 66. The second secondary gear 62 of this example further comprises a second secondary section 100, here exemplified as a flange. A radial extension of the second secondary section 100 is here larger than a radial extension of the second secondary teeth 98.

Figure 9:
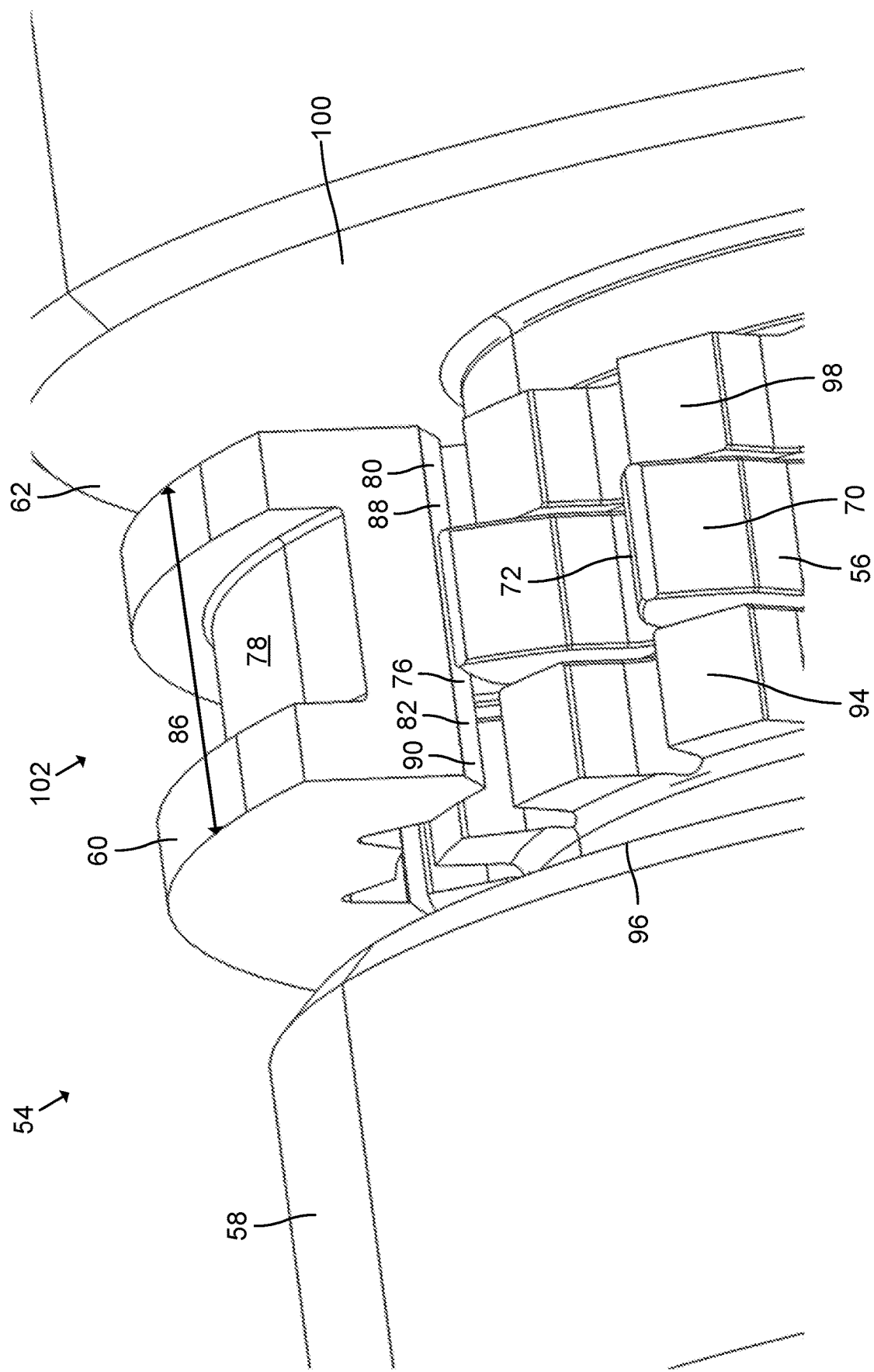
FIG. 9 shows a partial and partially cross-sectional perspective view of the transmission when the intermediate gear is in a disengaged position according to one example.
Figure 10:
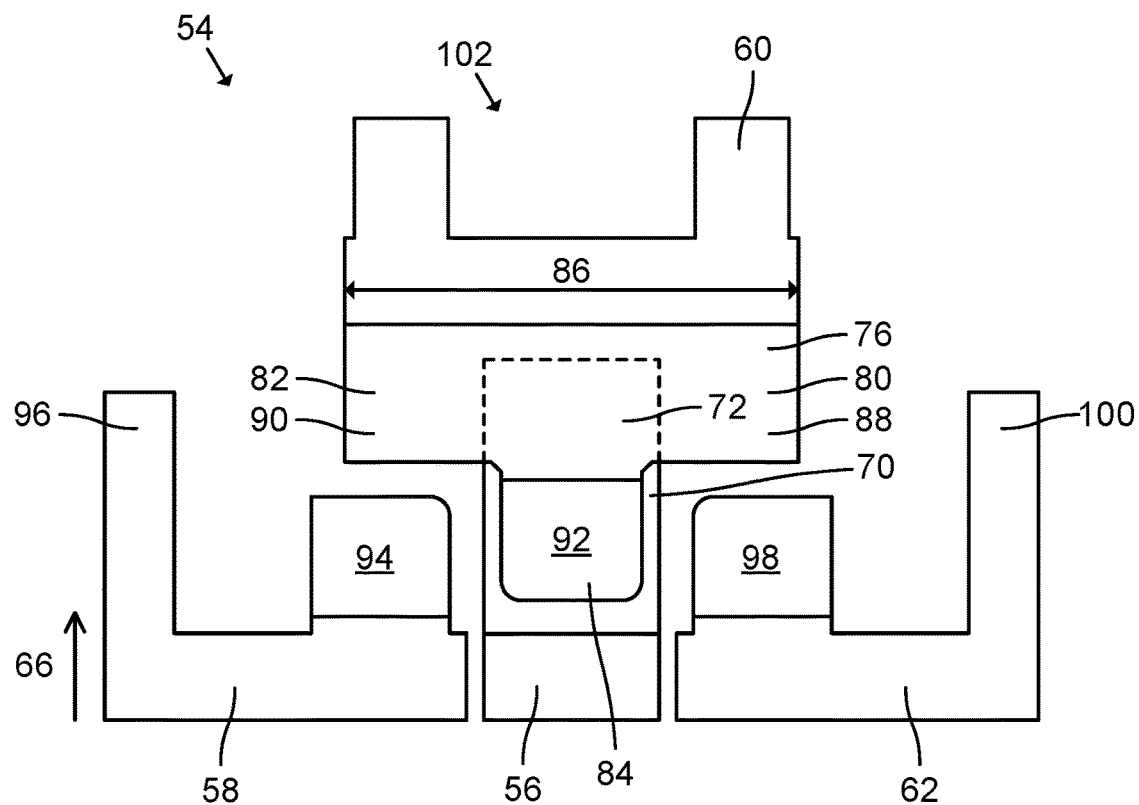
FIG. 10 shows a schematic partial cross-sectional front view of the transmission when the intermediate gear is in the disengaged position.
Figure 11:
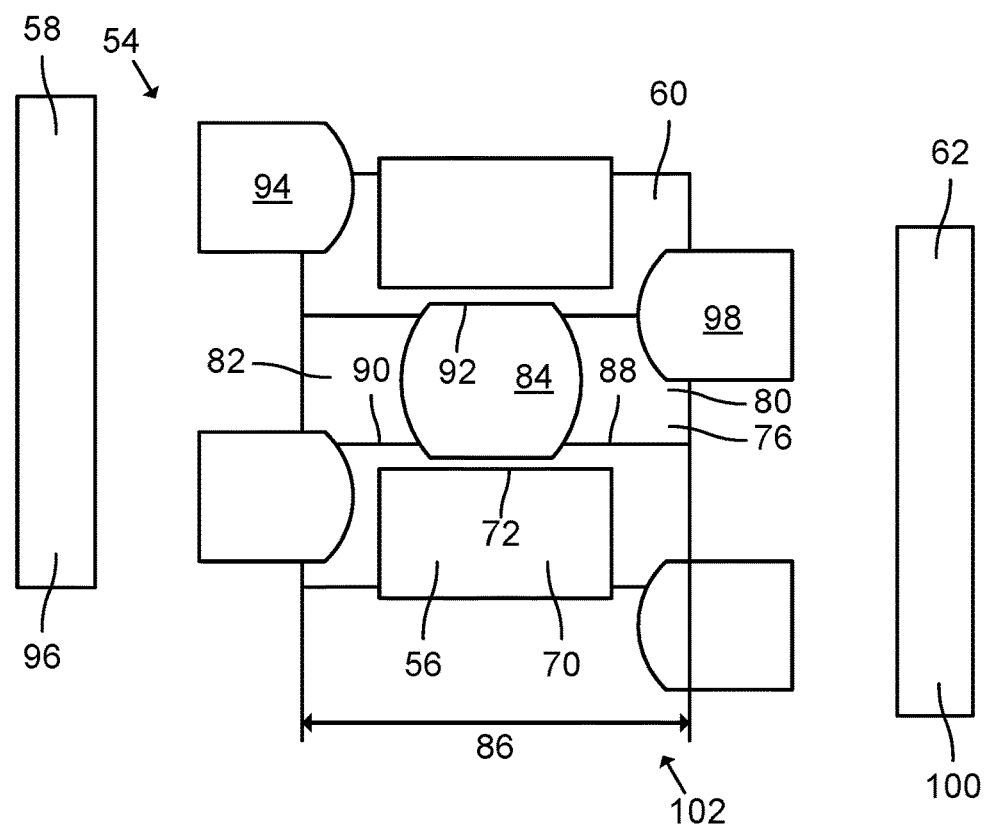
FIG. 11 shows a schematic partial cross-sectional radial view of the transmission when the intermediate gear is in the disengaged position.

FIG. 9 shows a partial and partially cross-sectional perspective view of the transmission 54. In FIG. 9, the intermediate gear 60 is in a disengaged position 102 according to one example. FIG. 10 further shows a schematic partial cross-sectional front view of the transmission 54 when the intermediate gear 60 is in the disengaged position 102, and FIG. 11 shows a schematic partial cross-sectional radial view of the transmission 54 when the intermediate gear 60 is in the disengaged position 102. With collective reference to FIGS. 9 to 11, when the intermediate gear 60 adopts the disengaged position 102, the transmission 54 adopts a disengaged or neutral state where no torque is transferred between the primary gear 56 and the first secondary gear 58, or between the primary gear 56 and the second secondary gear 62. As shown, the first secondary gear 58 and the second secondary gear 62 are arranged in parallel with respect to the primary gear 56. In this example, the first secondary gear 58 and the second secondary gear 62 are mirrored with respect to the primary gear 56.

In the disengaged position 102, the secondary intermediate parts 84 are axially aligned with the primary teeth 70. The intermediate gear 60 may thus be rotationally driven by the primary gear 56 in the disengaged position 102.

In this example, the first secondary teeth 94 are positioned entirely radially inside, and in axial alignment with, the second primary intermediate surfaces 90 in the disengaged position 102. Correspondingly, the second secondary teeth 98 are positioned entirely radially inside, and in axial alignment with, the first primary intermediate surface 88 in the disengaged position 102.

In this example, the first secondary teeth 94 and the second secondary teeth 98 have the same radial extensions. The radial extension of the primary teeth 70 is larger than the radial extensions of the first secondary teeth 94 and the second secondary teeth 98.

In this example, the first secondary teeth 94, the primary gear 56 and the second secondary teeth 98 are tightly sandwiched next to each other with very small gaps therebetween. The first secondary teeth 94 are positioned axially between the first secondary section 96 and the primary gear 56. Correspondingly, the second secondary teeth 98 are positioned axially between the second secondary section 100 and the primary gear 56.

Figure 12:
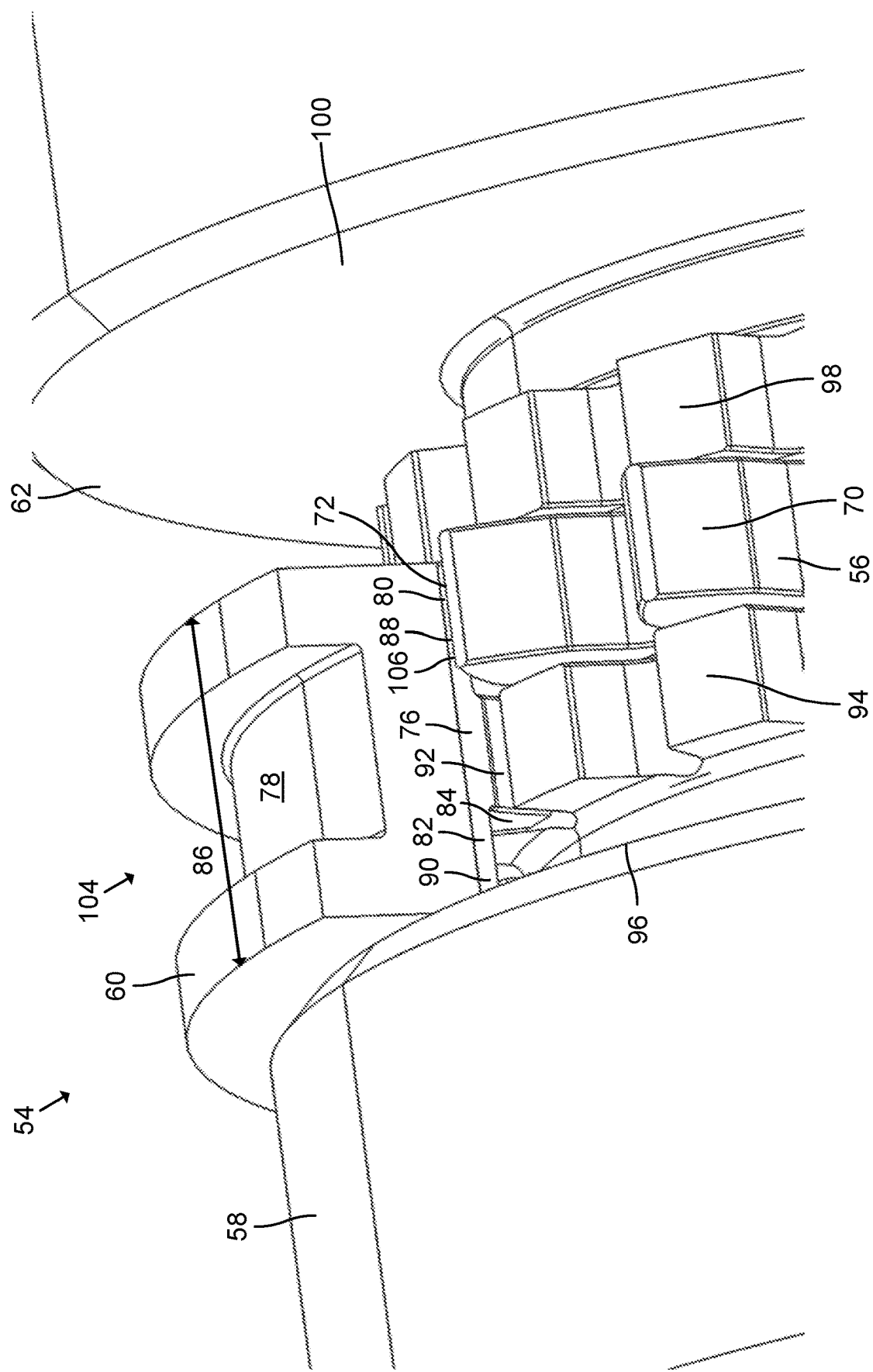
FIG. 12 shows a partial and partially cross-sectional perspective view of the transmission when the intermediate gear is in a first engaged position according to one example.
Figure 13:
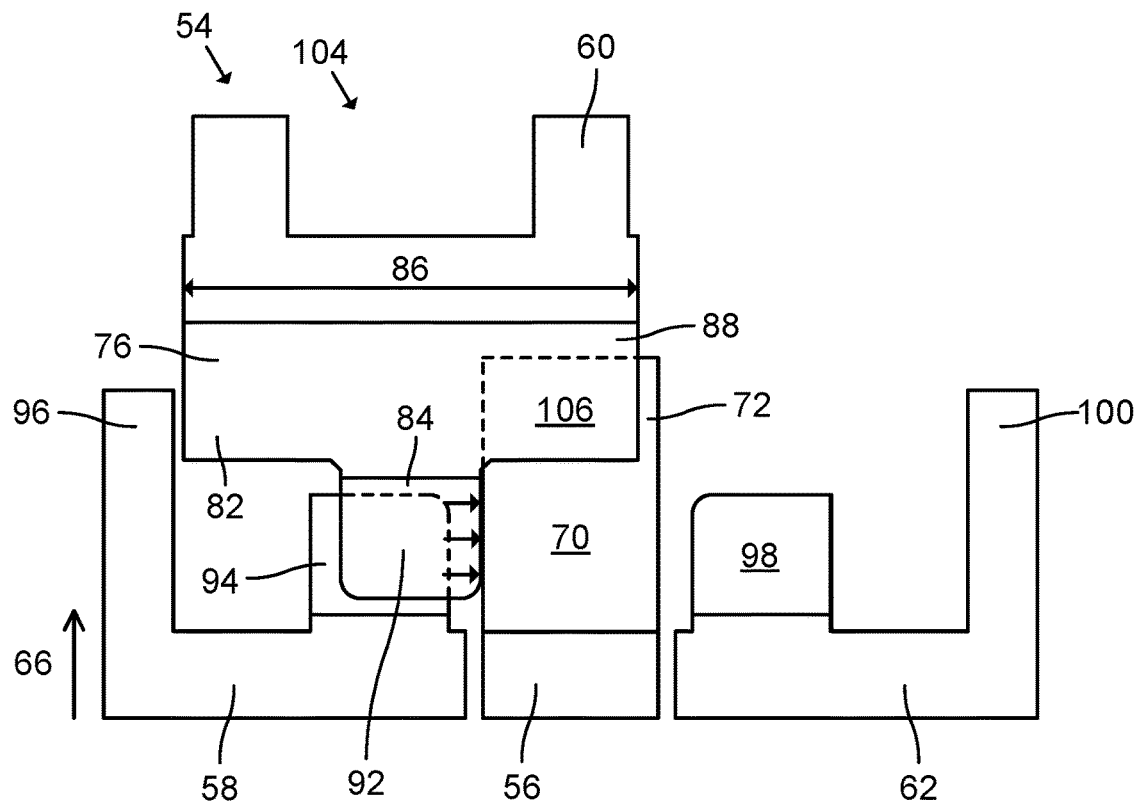
FIG. 13 shows a schematic partial cross-sectional front view of the transmission when the intermediate gear is in the first engaged position.
Figure 14:
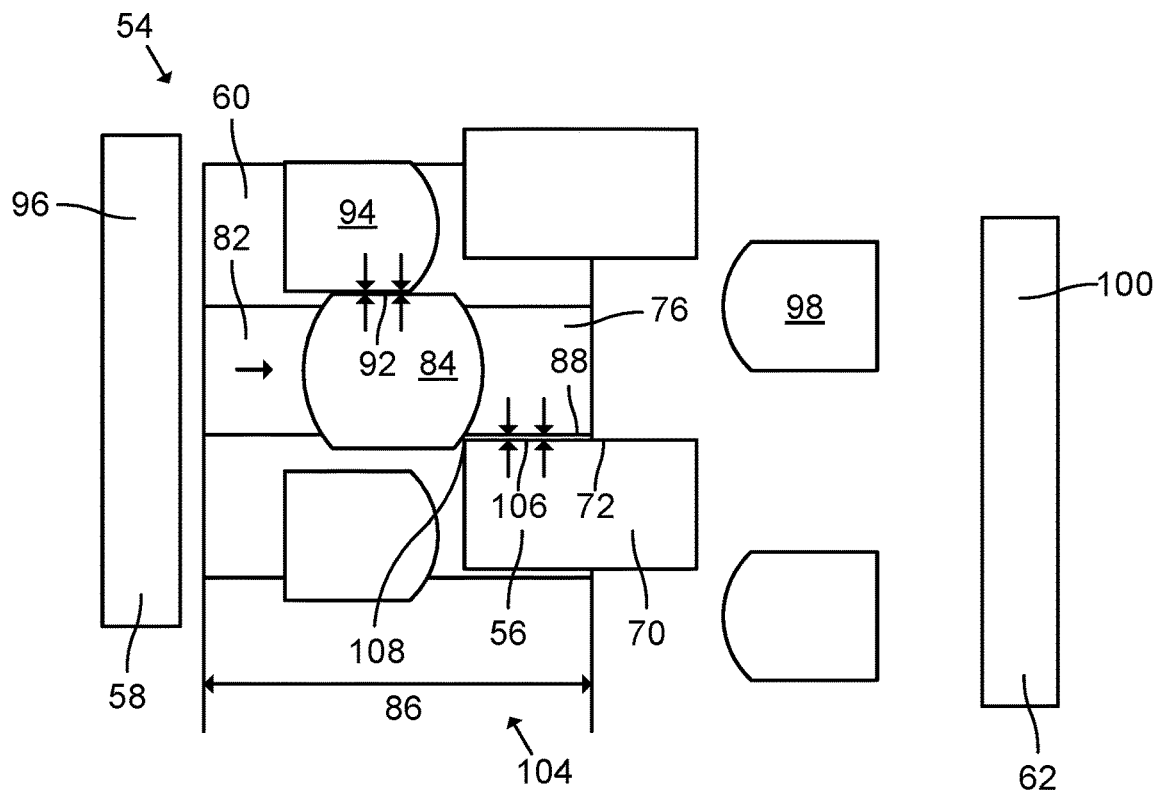
FIG. 14 shows a schematic partial cross-sectional radial view of the transmission when the intermediate gear is in the first engaged position.

FIG. 12 shows a partial and partially cross-sectional perspective view of the transmission 54 when the intermediate gear 60 is in a first engaged position 104 according to one example, FIG. 13 shows a schematic partial cross-sectional front view of the transmission 54 when the intermediate gear 60 is in the first engaged position 104, and FIG. 14 shows a schematic partial cross-sectional radial view of the transmission 54 when the intermediate gear 60 is in the first engaged position 104. With collective reference to FIGS. 12 to 14, when the intermediate gear 60 adopts the first engaged position 104, the transmission 54 adopts a first engaged state. In the first engaged position 104, torque is transferred between the primary gear 56 and the first secondary gear 58 via the intermediate gear 60. The intermediate gear 60 has been axially moved along the rotation axis 64 from the disengaged position 102 to the first engaged position 104. The first engaged position 104 is one example of an engaged position according to the disclosure.

In the first engaged position 104, a primary surface 72 of each primary tooth 70 is in driving contact with a first primary intermediate surface 88 of each intermediate tooth 76 in a contact region 106, and a secondary intermediate surface 92 of each intermediate tooth 76 is in driving contact with a first secondary tooth 94. As shown in FIG. 14, each pair of one primary tooth 70 and one intermediate tooth 76 forms an overlap 108 in the first engaged position 104. Due to the overlap 108, unintended disengagement of the intermediate gear 60 from the first engaged position 104 while transferring torque between the primary gear 56 and the first secondary gear 58 is prevented. In FIGS. 12 to 14, a movement of the intermediate gear 60 to the right is prevented. In case the intermediate gear 60 is moved slightly axially in an opposite direction, here to the left in FIGS. 12 to 14, the intermediate gear 60 will be stopped by an axial contact between the second primary intermediate part 82 and the first secondary section 96.

Figure 15:
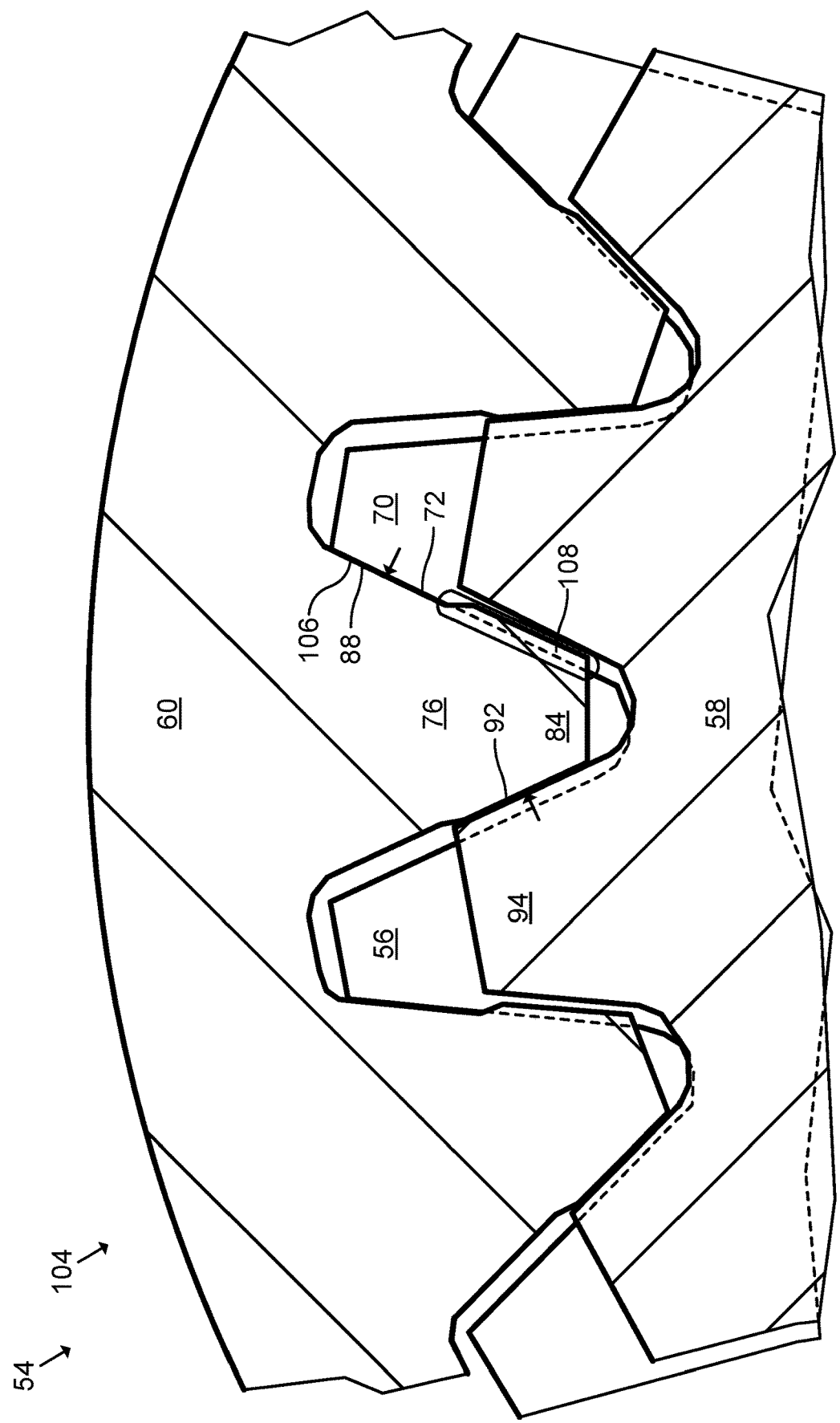
FIG. 15 shows a partial cross-sectional side view of the transmission when the intermediate gear is in the first engaged position according to one example.

FIG. 15 shows a partial cross-sectional side view of the transmission 54 when the intermediate gear 60 is in the first engaged position 104 according to one example. As shown in FIG. 15, the overlaps 108 are positioned radially inside the contact region 106 as seen along the rotation axis 64. Thus, similarly to the prior art transmission 10, the transmission 54 can prevent unintentional disengagement from the first engaged position 104 but with a more compact design along the rotation axis 64 and with a cheaper manufacturing process. Since the secondary intermediate part 84 both drivingly contacts a first secondary tooth 94 and forms the overlap 108 to prevent unintentional disengagement, the secondary intermediate part 84 performs a dual function in the first engaged position 104. As shown in FIG. 15, the overlaps 108 are substantially aligned with the first secondary teeth 94 in the radial direction 66.

In the example in FIG. 15, each secondary intermediate surface 92 is parallel with a first primary intermediate surface 88 of the same intermediate tooth 76 but offset therefrom, forming a step on each intermediate tooth 76, here on each secondary intermediate part 84.

Figure 16:
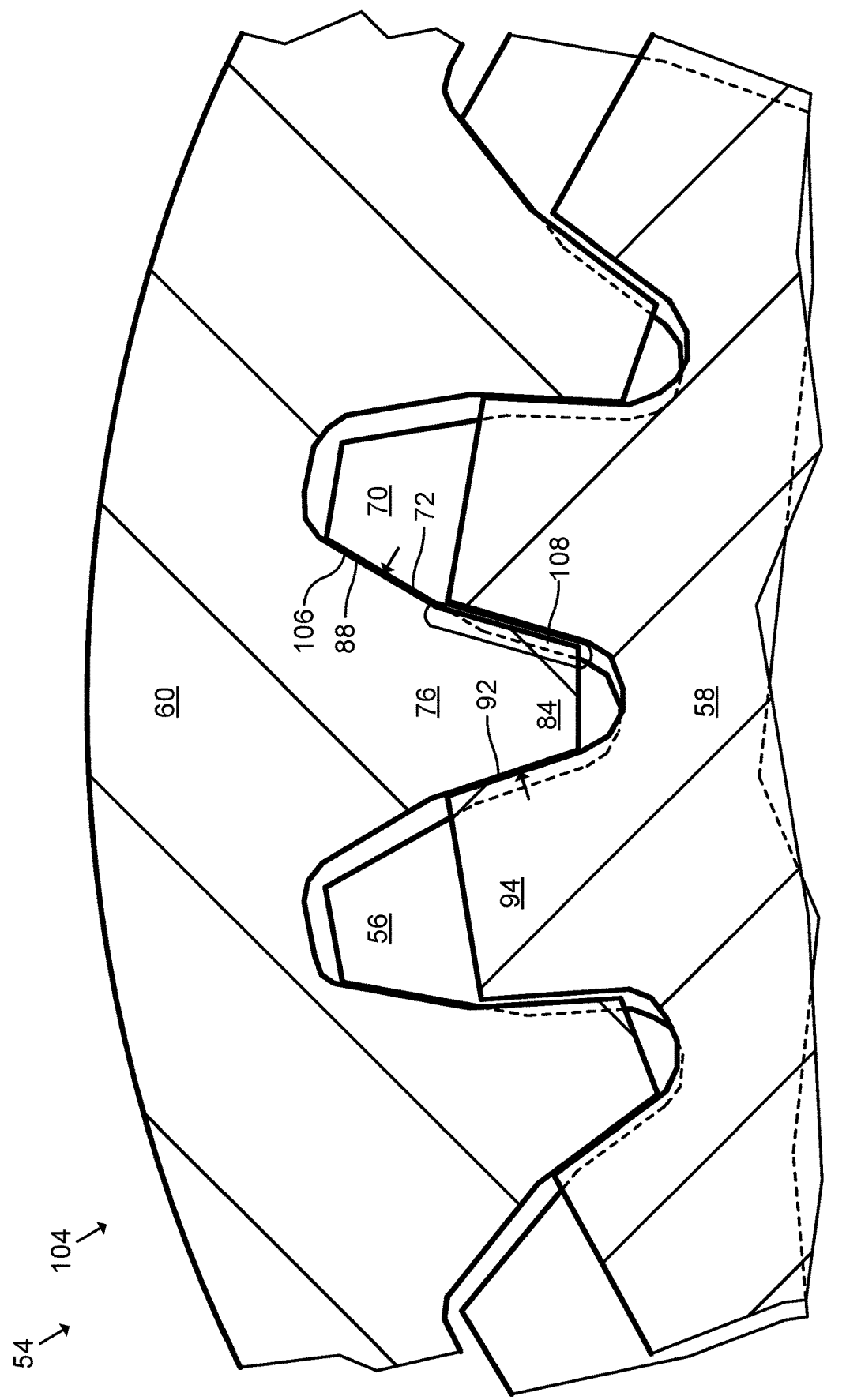
FIG. 16 shows a partial cross-sectional side view of the transmission when the intermediate gear is in the first engaged position according to one example.

FIG. 16 shows a partial cross-sectional side view of the transmission 54 when the intermediate gear 60 is in the first engaged position 104 according to one example. Mainly differences with respect to FIG. 15 will be described. In FIG. 16, each secondary intermediate surface 92 is non-parallel with a first primary intermediate surface 88 of the same intermediate tooth 76 and on a same side thereof. The roots of the primary teeth 70 are wider than in FIG. 15 and the secondary intermediate part 84 are narrower than in FIG. 15. Also in FIG. 16, overlaps 108 are formed between the primary teeth 70 and the intermediate tooth 76. The overlaps 108 radially inside the contact region 106 may thus be formed by many different profiles of the primary teeth 70 and the intermediate tooth 76. For example, the first primary intermediate surfaces 88, the secondary intermediate surfaces 92 and the second primary intermediate surfaces 90 do not have to be flat, but may adopt various profiles, such as involute profiles.

Figure 17:
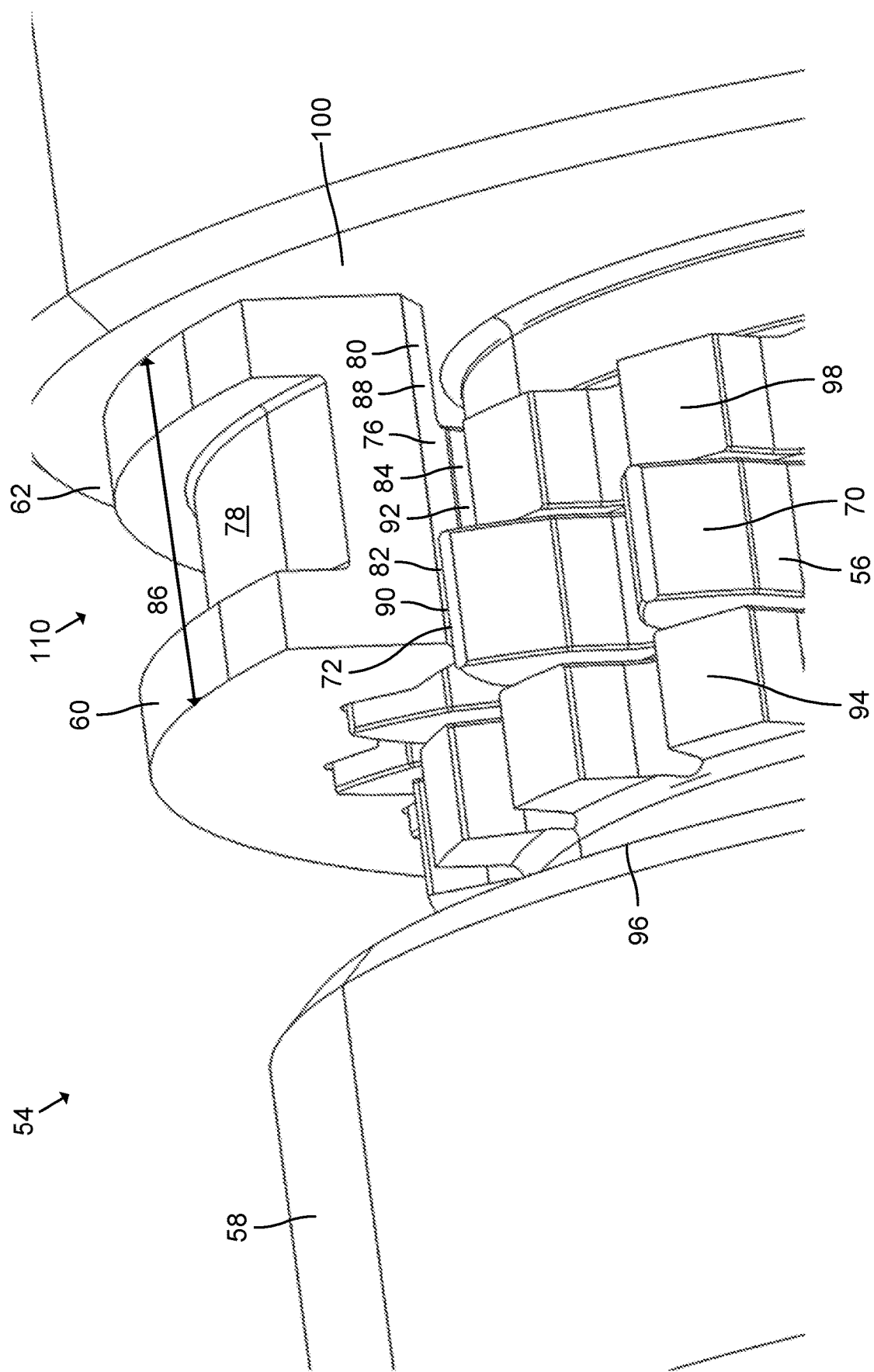
FIG. 17 shows a partial and partially cross-sectional perspective view of the transmission when the intermediate gear is in a second engaged position according to one example.

FIG. 17 shows a partial and partially cross-sectional perspective view of the transmission 54 when the intermediate gear 60 is in a second engaged position 110 according to one example. The second engaged position 110 is a further example of an engaged position according to the present disclosure. The disengaged position 102 is a position of the intermediate gear 60 between the first engaged position 104 and the second engaged position 110. When the intermediate gear 60 adopts the second engaged position 110, the transmission 54 adopts a second engaged state. In the second engaged position 110, torque is transferred between the primary gear 56 and the second secondary gear 62 via the intermediate gear 60. In the second engaged position 110, a primary surface 72 of each primary tooth 70 is in driving contact with second primary intermediate surfaces 90 of each intermediate tooth 76 in the contact region 106 and a secondary intermediate surface 92 of each intermediate tooth 76 is in driving contact with a second secondary tooth 98.

Also in the second engaged position 110, each pair of one primary tooth 70 and one intermediate tooth 76 forms the overlap 108. This overlap 108 prevents unintentional disengagement of the intermediate gear 60, here a movement to the left in FIG. 17. In case the intermediate gear 60 is moved slightly axially in an opposite direction, here to the right in FIG. 17, the intermediate gear 60 will be stopped by an axial contact between first primary intermediate part 80 and the second secondary section 100. Since the secondary intermediate part 84 both drivingly contacts a second secondary tooth 98 and forms the overlap 108 to prevent unintentional disengagement, the secondary intermediate part 84 performs a dual function also in the second engaged position 110.

Figure 18:
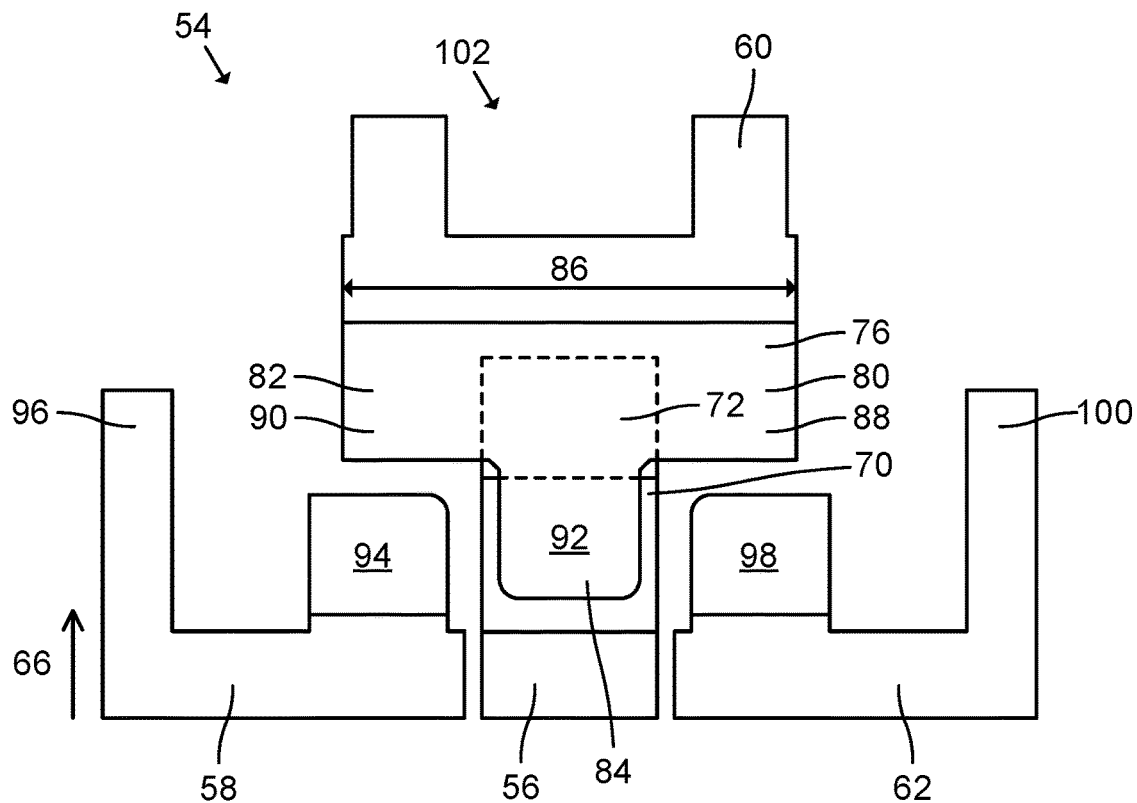
FIG. 18 shows a schematic partial cross-sectional front view of the transmission when the intermediate gear is in the disengaged position according to one example.
Figure 19:
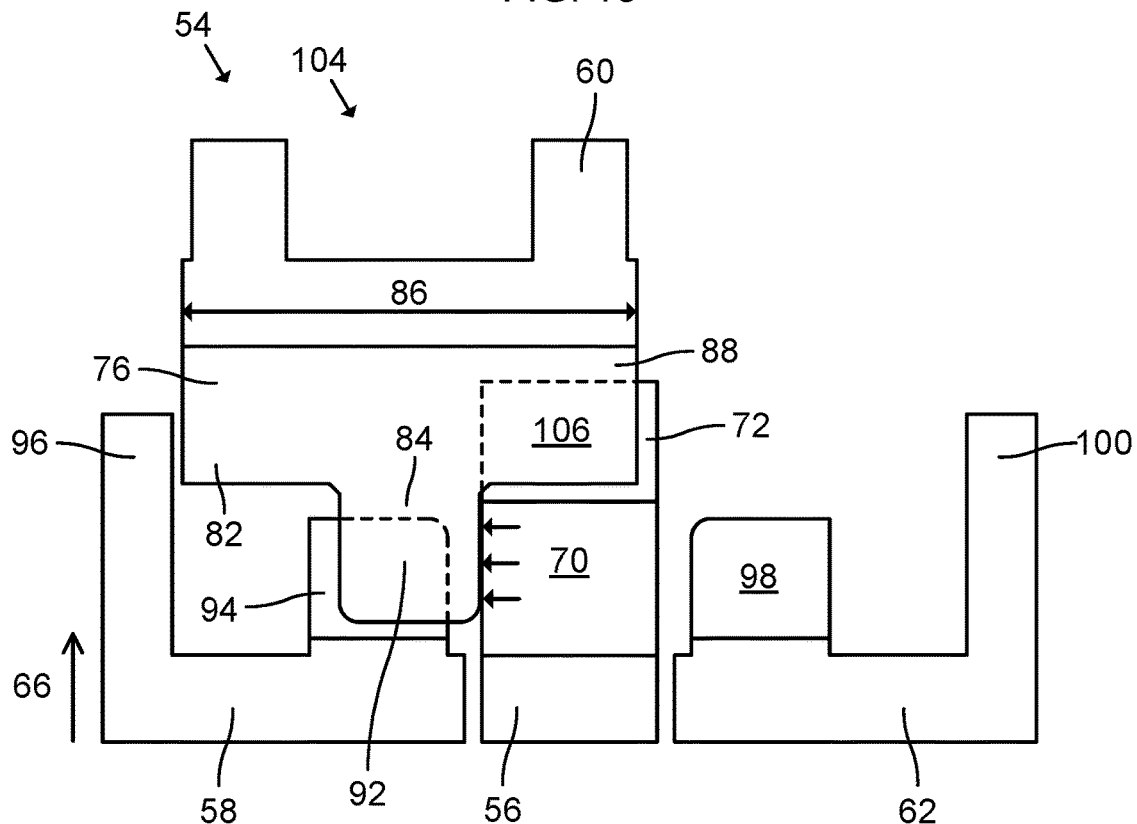
FIG. 19 shows a schematic partial cross-sectional front view of the transmission when the intermediate gear is in the first engaged position according to one example.
Figure 20:
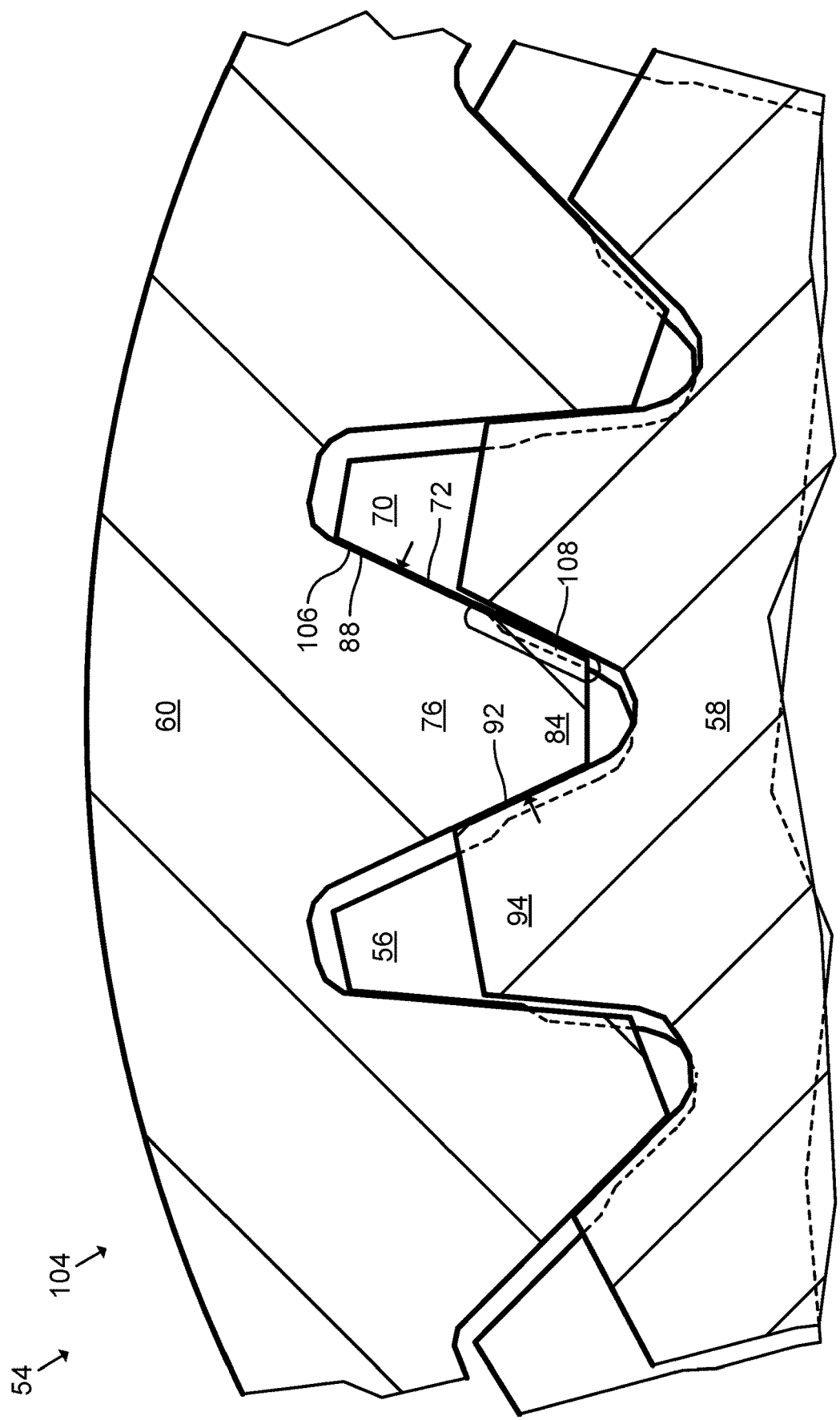
FIG. 20 shows a partial cross-sectional side view of the transmission when the intermediate gear is in the first engaged position according to one example.

FIG. 18 shows a schematic partial cross-sectional front view of the transmission 54 when the intermediate gear 60 is in the disengaged position 102 according to one example, FIG. 19 shows a schematic partial cross-sectional front view of the transmission 54 when the intermediate gear 60 is in the first engaged position 104 according to one example, and FIG. shows a partial cross-sectional side view of the transmission 54 when the intermediate gear 60 is in the first engaged position 104 according to one example. With collective reference to FIGS. 18 to 20, mainly differences with respect to FIGS. 10, 13 and 15 will be described. In the transmission 54 in FIGS. 18 to 20, a step is formed on each primary tooth 70, instead of on each intermediate tooth 76, to provide the overlaps 108. In the example in FIG. 20, each secondary intermediate surface 92 is parallel with, and lies in a common plane with, a first primary intermediate surface 88 of the same intermediate tooth 76.

Figure 21:
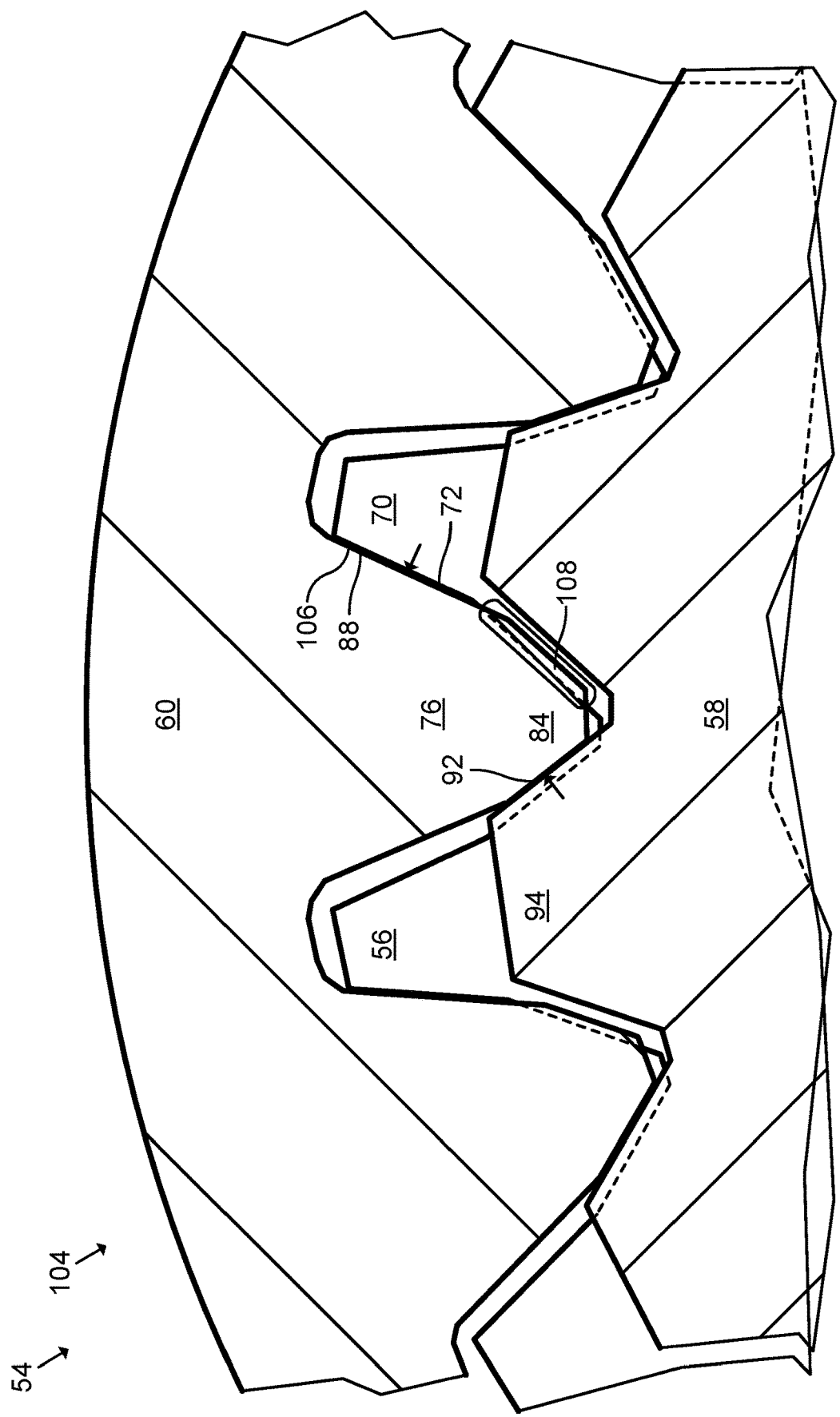
FIG. 21 shows a partial cross-sectional side view of the transmission when the intermediate gear is in the first engaged position according to one example.

FIG. 21 shows a partial cross-sectional side view of the transmission 54 when the intermediate gear 60 is in the first engaged position 104 according to one example. Mainly differences with respect to FIG. 20 will be described. In FIG. 21, the roots of the primary teeth 70 are wider than in FIG. 20 and the secondary intermediate parts 84 are narrower than in FIG. 21.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

What is claimed is:

1. A transmission comprising:
    a primary gear rotatable about a rotation axis and including primary teeth, where each primary tooth has a primary surface;
    a secondary gear rotatable about the rotation axis and including secondary teeth;
    an intermediate gear rotatable about the rotation axis and including intermediate teeth, where each of the intermediate teeth comprises a primary intermediate part having a primary intermediate surface and a secondary intermediate part having a secondary intermediate surface, where the primary intermediate part is axially offset from the secondary intermediate part with respect to the rotation axis, and where the intermediate gear is axially displaceable along the rotation axis between an engaged position where the primary surface contacts the primary intermediate surface in a contact region and the secondary intermediate surface contacts one of the secondary teeth, and a disengaged position;
    wherein in the engaged position, one primary tooth and one intermediate tooth form an overlap, radially inside the contact region with respect to the rotation axis and as seen along the rotation axis, for preventing the intermediate gear from being displaced from the engaged position to the disengaged position.

2. The transmission according to claim 1, wherein the intermediate teeth each have a constant cross-sectional profile along the primary intermediate surface across a width of the intermediate gear.

3. The transmission according to claim 1, wherein the secondary teeth are positioned radially inside the primary intermediate part with respect to the rotation axis.

4. The transmission according to claim 3, wherein the secondary teeth are entirely positioned radially inside the primary intermediate part with respect to the rotation axis.

5. The transmission according to claim 1, wherein the overlap and the secondary teeth are substantially aligned in a radial direction with respect to the rotation axis.

6. The transmission according to claim 1, wherein the primary intermediate surface and the secondary intermediate surface are machined with a machining tool having moving axially through the intermediate gear with respect to the rotation axis.

7. The transmission according to claim 1, wherein the primary intermediate parts are first primary intermediate parts, wherein the primary intermediate surfaces are first primary intermediate surfaces, and wherein the intermediate teeth each further comprises a second primary intermediate part having a second primary intermediate surface arranged on an opposite side of the secondary intermediate surface with respect to the first primary intermediate surface, and wherein the second primary intermediate surfaces and the first primary intermediate surface have corresponding designs.

8. The transmission according to claim 7, wherein the engaged position is a first engaged position, wherein the secondary gear is a first secondary gear, wherein the secondary teeth are first secondary teeth, and wherein the transmission further comprises:
 a second secondary gear rotatable about the rotation axis and including second secondary teeth;
 wherein the intermediate gear is axially displaceable from the first engaged position, through the disengaged position and to a second engaged position where the primary surface contacts the second primary intermediate surface and the secondary intermediate surface contacts one of the second secondary teeth.

9. The transmission according to claim 8, wherein the first secondary teeth and the second secondary teeth are positioned radially inside the first primary intermediate parts and the second primary intermediate parts with respect to the rotation axis.

10. A gearbox comprising the transmission according to claim 1.

11. A vehicle comprising the transmission according to claim 1.

* * * * *